(12) United States Patent
Wirthlin

(10) Patent No.: US 9,464,953 B2
(45) Date of Patent: Oct. 11, 2016

(54) SYSTEM AND METHOD FOR GAUGING SAFE TOWING PARAMETERS

(71) Applicant: Alvin R. Wirthlin, Spanish Fork, UT (US)

(72) Inventor: Alvin R. Wirthlin, Spanish Fork, UT (US)

( * ) Notice: Subject to any disclaimer, the term of this patent is extended or adjusted under 35 U.S.C. 154(b) by 950 days.

(21) Appl. No.: 13/630,476

(22) Filed: Sep. 28, 2012

(65) Prior Publication Data

US 2013/0080078 A1 Mar. 28, 2013

Related U.S. Application Data

(60) Provisional application No. 61/540,196, filed on Sep. 28, 2011, provisional application No. 61/603,247, filed on Feb. 25, 2012.

(51) Int. Cl.
| | |
|---|---|
| *G01L 1/00* | (2006.01) |
| *G01L 1/22* | (2006.01) |
| *G01L 5/13* | (2006.01) |
| *G01G 19/08* | (2006.01) |
| *B60D 1/24* | (2006.01) |
| *B60D 1/62* | (2006.01) |

(52) U.S. Cl.
CPC ............ *G01L 1/2243* (2013.01); *G01G 19/08* (2013.01); *G01L 5/136* (2013.01); *B60D 1/248* (2013.01); *B60D 1/62* (2013.01)

(58) Field of Classification Search
CPC ... G01L 1/2243; G01L 15/136; B60D 1/248; B60D 1/62; G01G 19/08; G01G 19/12; Y10T 29/49963

USPC ............. 73/760, 862.381, 862.827, 862, 381
See application file for complete search history.

(56) References Cited

U.S. PATENT DOCUMENTS

| | | | |
|---|---|---|---|
| 3,797,594 A * | 3/1974 | Chaffee ..................... | 177/136 |
| 6,494,478 B1* | 12/2002 | MacKarvich ............... | 280/489 |
| 9,004,523 B2* | 4/2015 | Scharf .......................... | 280/511 |
| 2004/0036601 A1* | 2/2004 | Obradovich .................. | 340/540 |
| 2006/0290102 A1* | 12/2006 | VanBuskirk, Jr. ........... | 280/511 |
| 2009/0107735 A1* | 4/2009 | Cleary ......................... | 177/136 |
| 2010/0114437 A1* | 5/2010 | Boss et al. .................... | 701/48 |
| 2012/0024081 A1* | 2/2012 | Baker ...................... | 73/862.338 |
| 2012/0096824 A1* | 4/2012 | Burger ......................... | 56/119 |
| 2013/0253814 A1* | 9/2013 | Wirthlin ........................ | 701/124 |

* cited by examiner

*Primary Examiner* — Max Noori
(74) *Attorney, Agent, or Firm* — Alvin R. Wirthlin

(57) ABSTRACT

A system for determining the tongue weight of a towed vehicle and other parameters includes a drawbar transducer in one embodiment and a receiver hitch transducer in another embodiment. Strain gauges are strategically located on the transducer and information regarding the towed vehicle are sent to a display. In one embodiment, a portable display unit has a radio frequency transceiver for receiving transmitted data from the transducer reflective of the towed vehicle tongue weight so that a user can view the tongue weight in practically real time. In this manner, the user can adjust the contents of the towed vehicle to achieve proper tongue weight without the necessity of going back and forth between the trailer and the transducer. A method is also disclosed for determining a safe towing condition based on the trailer tongue weight, trailer pulling force, acceleration during towing, and calculated trailer weight.

33 Claims, 16 Drawing Sheets

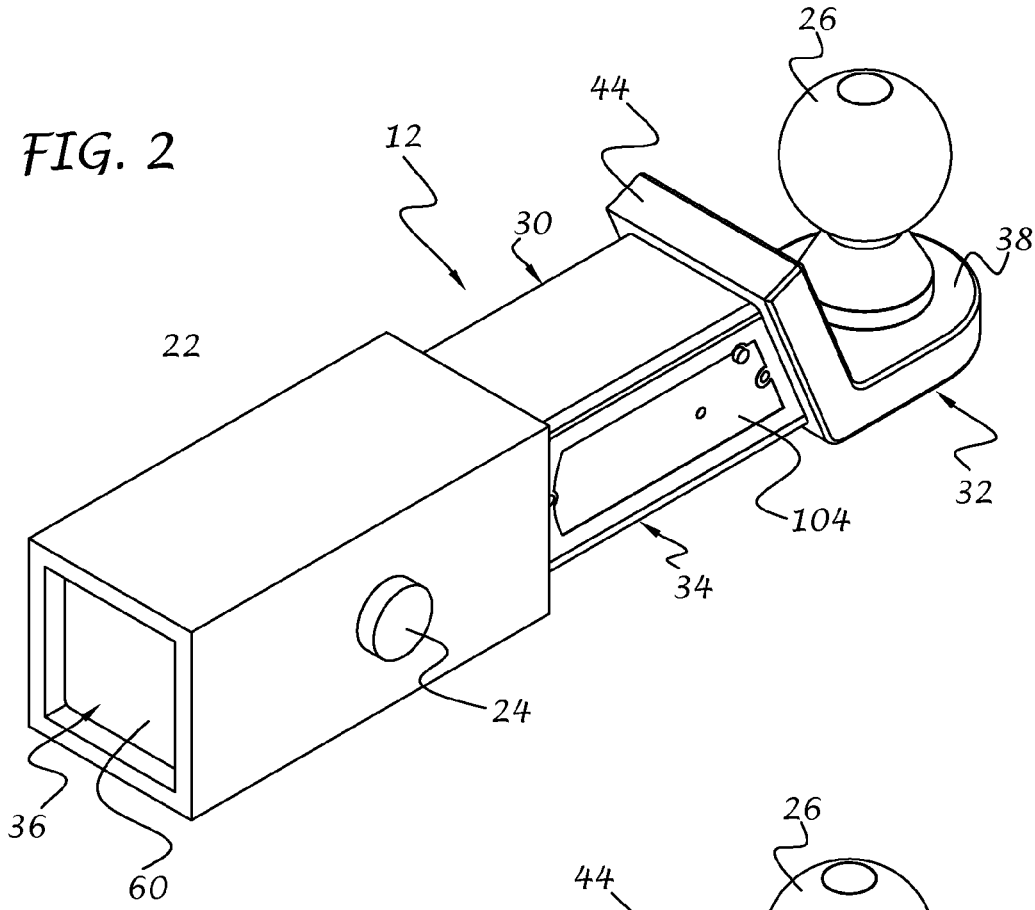

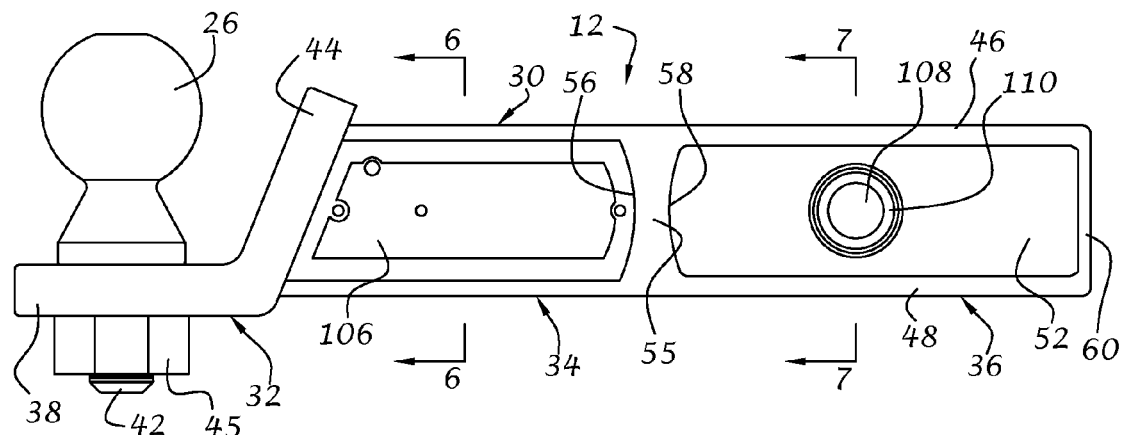
FIG. 5
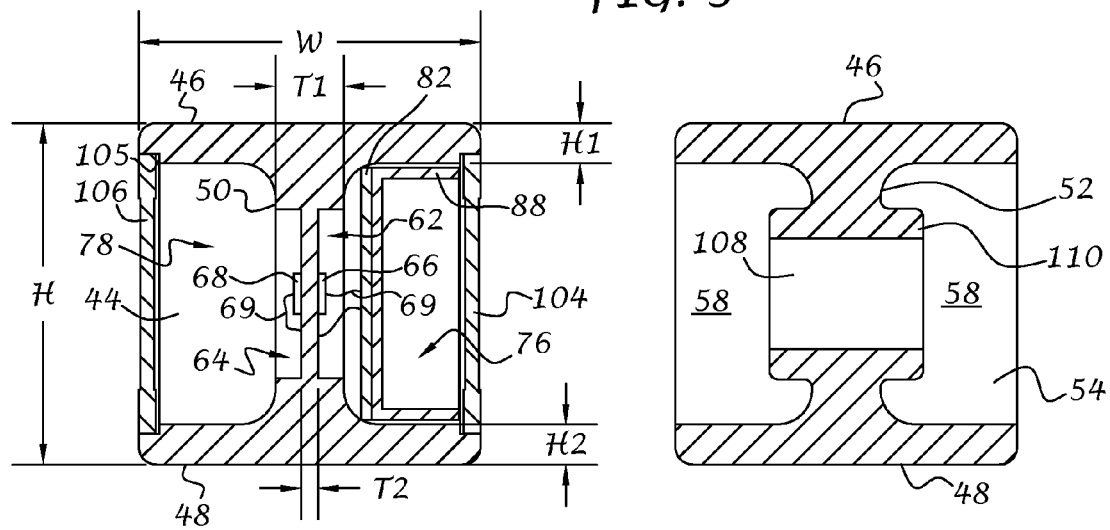
FIG. 6
FIG. 7
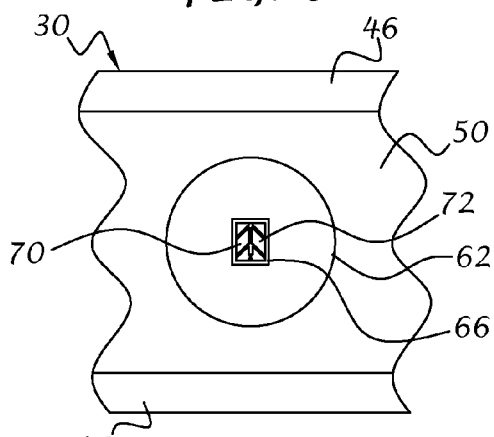
FIG. 6A
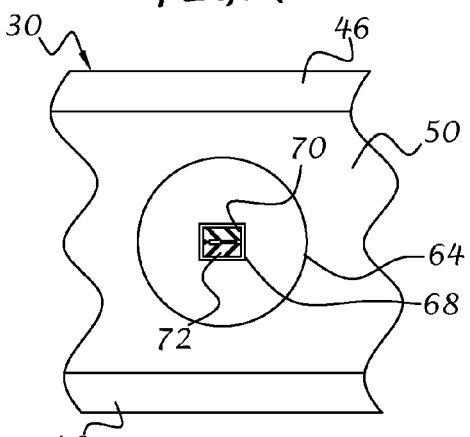
FIG. 6B

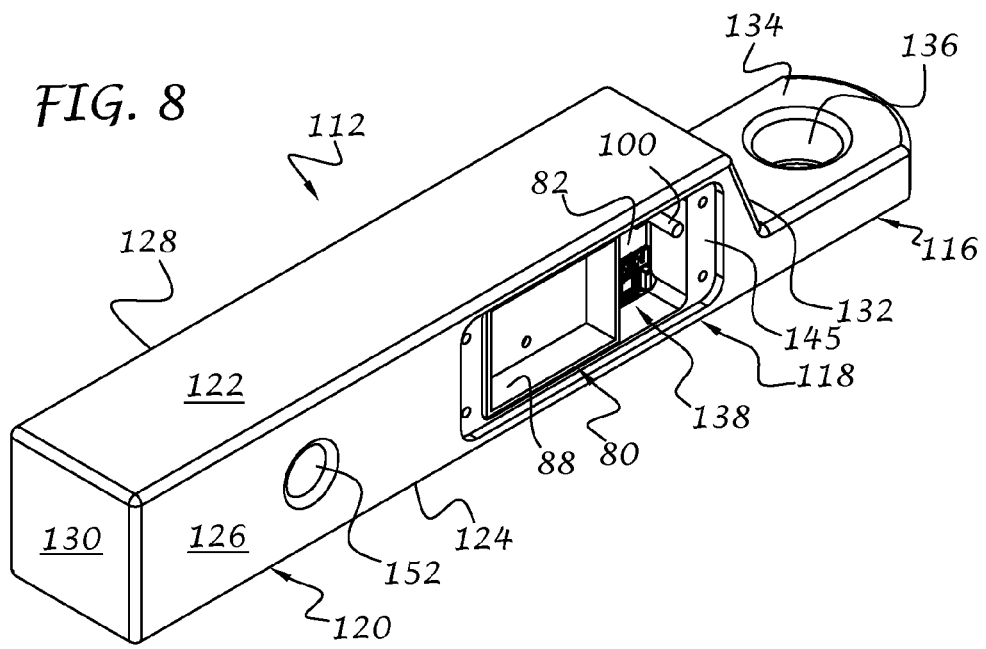
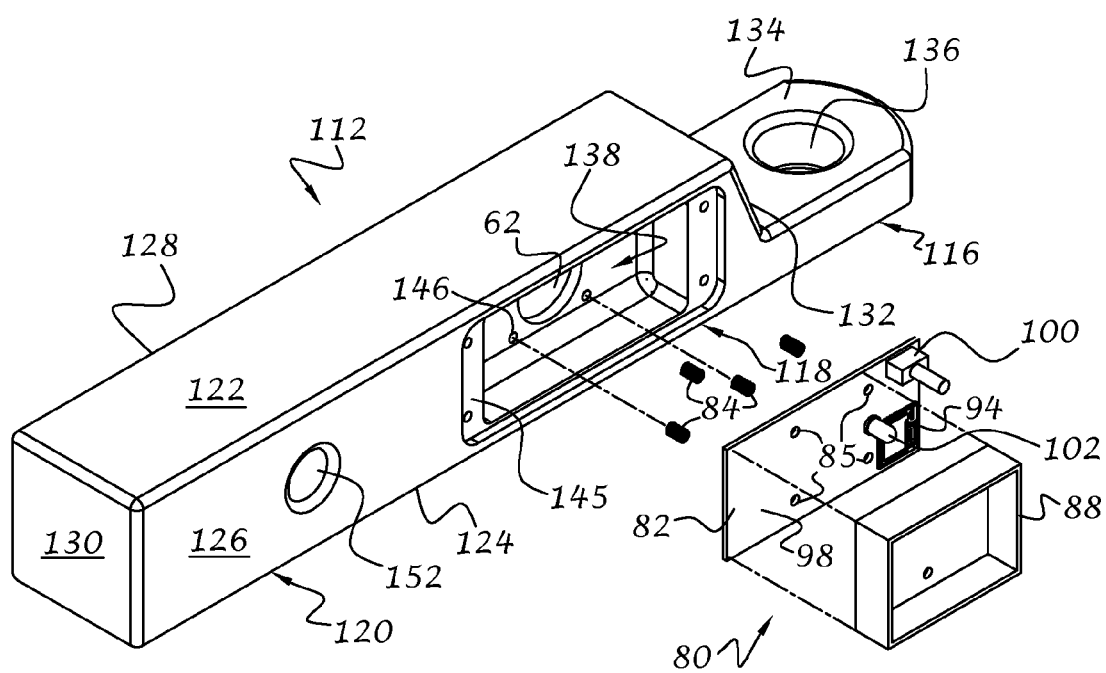

SYSTEM AND METHOD FOR GAUGING SAFE TOWING PARAMETERS

CROSS-REFERENCE TO RELATED APPLICATIONS

This application claims the benefit of U.S. Provisional Application No. 61/540,196 filed on Sep. 28, 2011 and U.S. Provisional Application No. 61/603,247 filed on Feb. 25, 2012, the disclosures of which are hereby incorporated by reference.

BACKGROUND OF THE INVENTION

This invention relates to measurement devices, and more particularly to a system and method for determining the tongue weight, gross vehicle weight, and other parameters related to the safe towing of a trailer or other towed vehicle.

The tongue weight of a trailer often varies as a trailer is loaded and unloaded. The determination of tongue weight is key to safe transportation practices since all vehicle hitches have a maximum tongue weight limit. However, the determination of tongue weight in the past has been left largely up to guesswork, thereby compromising safety. If for example the weight on the hitch is too small, the trailer may shimmy and sway possibly causing loss of control and an accident or other catastrophic event. If the weight is too high on the hitch, then the rear of the towing vehicle is overloaded and the steering wheels and brakes are less effective, leading to loss of control of the towing vehicle and the inability to stop the towing vehicle and trailer as anticipated.

Various mechanical and electro-mechanical devices for measuring the tongue weight of a trailer have been proposed. Mechanical-type devices typically include a first structural component that rests on the ground or receiver hitch of a towing vehicle, a second structural member that fits in the tongue of a trailer or other towed vehicle, and a biasing member, such as a compression spring, that biases the first and second structural members apart. As a load is applied to the tongue of the trailer, the second structural component will proportionately move with respect to the first structural component. A stationary scale on the first structural component is proportionately hidden or uncovered depending on the tongue weight. However, such as device is has very limited resolution and often functions as a go-no-go gauge, i.e. either the trailer tongue is overloaded or it is not.

Another solution uses the same principle but relies on hydraulic pressure to drive a gauge with a rotating pointer along a stationary scale. Although this solution provides more accuracy, typically in the range of 50 lbf that can be legibly read, the user is still left guessing as to the exact weight of the tongue. In addition, such devices can only be temporarily used during trailer loading. This is inconvenient to most users since it is desirous to hook the trailer up to the towing vehicle prior to loading. Since some objects to be loaded can be quite heavy, such as farm equipment, ATV's, motorcycles, and so on, there is a danger of the trailer tipping rearwardly if it is not properly coupled to the towing vehicle prior to loading. Accordingly, such sensors in and over themselves become an inconvenience. Moreover, even when such a device can be used, it quickly becomes a nuisance for the user to constantly walk back and forth between the device and the trailer to determine if the trailer tongue is at the proper weight.

In addition, trailers are often rented to customers who typically have little towing experience. Such users typically are not familiar with the dangers of overloading and underloading the tongue weight, exceeding the gross rated weight of the trailer, exceeding the recommended towing speed, sudden braking, going too fast around curved sections of the roadway, towing in inclement weather, and so on. Such unsafe towing conditions can lead to trailer mishaps, loss of property, serious injury, and other catastrophic events. It is often difficult to determine whether or not the driver was at fault or if there was a mechanical failure or weather or road conditions, or combinations thereof, that lead the catastrophic event. Accordingly, investigations to determine liability can be quite costly.

Moreover, vehicle manufacturers typically offer bumper-to-bumper warranties for a predetermined time period and/or up to a predetermined mileage limit, subjected to normal driving conditions. However, when the customer drives the vehicle beyond its intended limits during the warranty period, the manufacturer is often left to cover the costs of repair since, in the past, a quantifying method for determining whether the customer or manufacturer is at fault, has been lacking. This is especially problematic for new vehicles with towing packages. In the past, the vehicle manufacturer or authorized dealer has had to rely heavily on the customer's word that the vehicle being towed did not exceed the manufacturer's guidelines for the maximum tongue weight of the trailer or other towed vehicle and/or the towing capacity of the towing vehicle. This problem is exacerbated by the fact that customers do not have the means for determining the trailer tongue weight or the gross vehicle weight rating of the trailer and the manufacturer. Thus, in many instances, the customer may be acting in good faith without realizing that the towing capacity of the vehicle has been greatly exceeded. When such circumstances occur, warranty items such as the engine, transmission, and/or other drive train components, as well as suspension components, may become damaged and in need of repair or replacement, costs which are necessarily covered by the vehicle manufacturer.

It would therefore be desirous to provide a system and method for determining the tongue weight, gross vehicle weight, and other parameters of the towed vehicle in order to quantify whether or not the towing capacity of the towing vehicle has been exceeded.

BRIEF SUMMARY OF THE INVENTION

According to one aspect of the invention, a drawbar transducer for determining a tongue weight of a towed vehicle includes a coupling section being adapted for connection to a hitch ball for coupling with a trailer tongue, a mounting section being adapted for connection to a hitch of a towing vehicle, and a transducer section located between the coupling section and the mounting section. The transducer section includes a measurement wall having a first thickness, at least one sensor area formed in the measurement wall having a second thickness that is less than the first thickness, and at least one strain sensor located in the senor area for sensing a load applied to the coupling section.

According to a further aspect of the invention, a system for determining the tongue weight of a towed vehicle includes the drawbar transducer as described above and further includes a portable display unit. The portable display unit has a radio frequency receiver or transceiver for receiving the transmitted data reflective of the applied load on the drawbar transducer, a processor for processing the transmitted data, and a display operably connected to the processor for displaying information related to the tongue weight of a towed vehicle based on the transmitted data.

According to yet a further aspect of the invention, a system for determining the tongue weight of a towed vehicle comprises a transducer body and a display for displaying information related to the tongue weight of a towed vehicle based on the transmitted data. The transducer body has a coupling section adapted for connection to a hitch ball for coupling with a trailer tongue, a mounting section adapted for receipt into a receiver hitch of a towing vehicle, and a transducer section located between the coupling section and the mounting section. The transducer section includes first and second compartments formed in opposite sides of the transducer body to form a measurement wall with a first thickness, first and second sensor areas formed in opposite sides of the measurement wall in the first and second compartments, respectively, the measurement wall having a second thickness at the sensor areas that is less than the first thickness, and at least one strain sensor located in at least one of the first and second senor areas for sensing a load applied to the coupling section.

In accordance with another aspect of the invention, a receiver hitch system includes a crossbar, a mounting bracket connected at opposite ends of the crossbar for connecting the receiver hitch to a tow vehicle, and a receiver tube extending rearwardly from the crossbar. The receiver tube is adapted for connection to a drawbar to thereby couple a trailer to the tow vehicle. The system also includes a first strain sensor operably associated with the receiver hitch for measuring at least one of a trailer tongue weight and trailer pull force. A processor is operably connected to the first strain sensor for calculating the at least one trailer tongue weight and trailer pull force.

In accordance with yet another aspect of the invention, a modular strain sensor assembly includes a sensor mounting plate have a first face and a second face located on an opposite side of the sensor mounting plate, a first recessed sensor area formed in the first face, a second recessed sensor area formed in the second face opposite the first recessed sensor area to thereby create a center web therebetween, a first strain gauge fixedly secured to the center web in the first recessed sensor area, and a second strain gauge fixedly secured to the center web in the second recessed sensor area. A first thickness between the first and second faces is greater than a second thickness of the center web such that shear stresses on the center web is greater than shear stresses on the first and second faces when a load is applied to the modular strain sensor assembly.

According to a further aspect of the invention, a receiver hitch system having at least at least one modular strain sensor assembly as set forth above includes a crossbar, a mounting bracket connected at opposite ends of the crossbar for connecting the receiver hitch to a tow vehicle, and a receiver tube extending rearwardly from the crossbar for connection to a drawbar to thereby couple a trailer to the tow vehicle. The at least one modular strain sensor assembly is located on one of the receiver tube and crossbar for measuring one of a trailer pull force and a trailer tongue weight. A second modular strain sensor assembly is located on the other of the receiver tube and crossbar for measuring the other of the trailer pull force and trailer tongue weight.

In accordance with a further embodiment of the invention, a method for determining a safe towing condition of a trailer with respect to a predetermined tow rating of a tow vehicle includes determining a tongue weight of the trailer; pulling the trailer with the tow vehicle; measuring acceleration and pull forces of the trailer during pulling; and determining the weight of the trailer by dividing the pull force by the acceleration multiplying the quotient by a gravitational acceleration. A safe towing condition can be determined when a ratio of the tongue weight to the trailer weight is within a predetermined range.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 2 is a rear isometric view of a drawbar transducer connected to the receiver hitch of a vehicle that can form part of the system of FIG. 1;

FIG. 3 is a rear isometric view of the drawbar transducer without the receiver hitch;

FIG. 5 is a right side elevational view of the drawbar transducer;

FIG. 6 is an enlarged sectional view of the drawbar transducer taken along line 6-6 of FIG. 5;

FIG. 6A is an enlarged left side elevational view of a portion of a sensing section of the drawbar transducer;

FIG. 6B is an enlarged right side elevational view of a portion of the sensing section of the drawbar transducer;

FIG. 7 is an enlarged sectional view of the drawbar transducer taken along line 7-7 of FIG. 5;

FIG. 8 is a rear isometric view of a drawbar transducer for determining the tongue weight of a towed vehicle and other parameters in accordance with a further embodiment of the present invention;

FIG. 9 is a rear isometric exploded view thereof;

FIG. 25A is a sectional view of the modular strain sensor assembly taken along line 25A-25A of FIG. 25.

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 1:
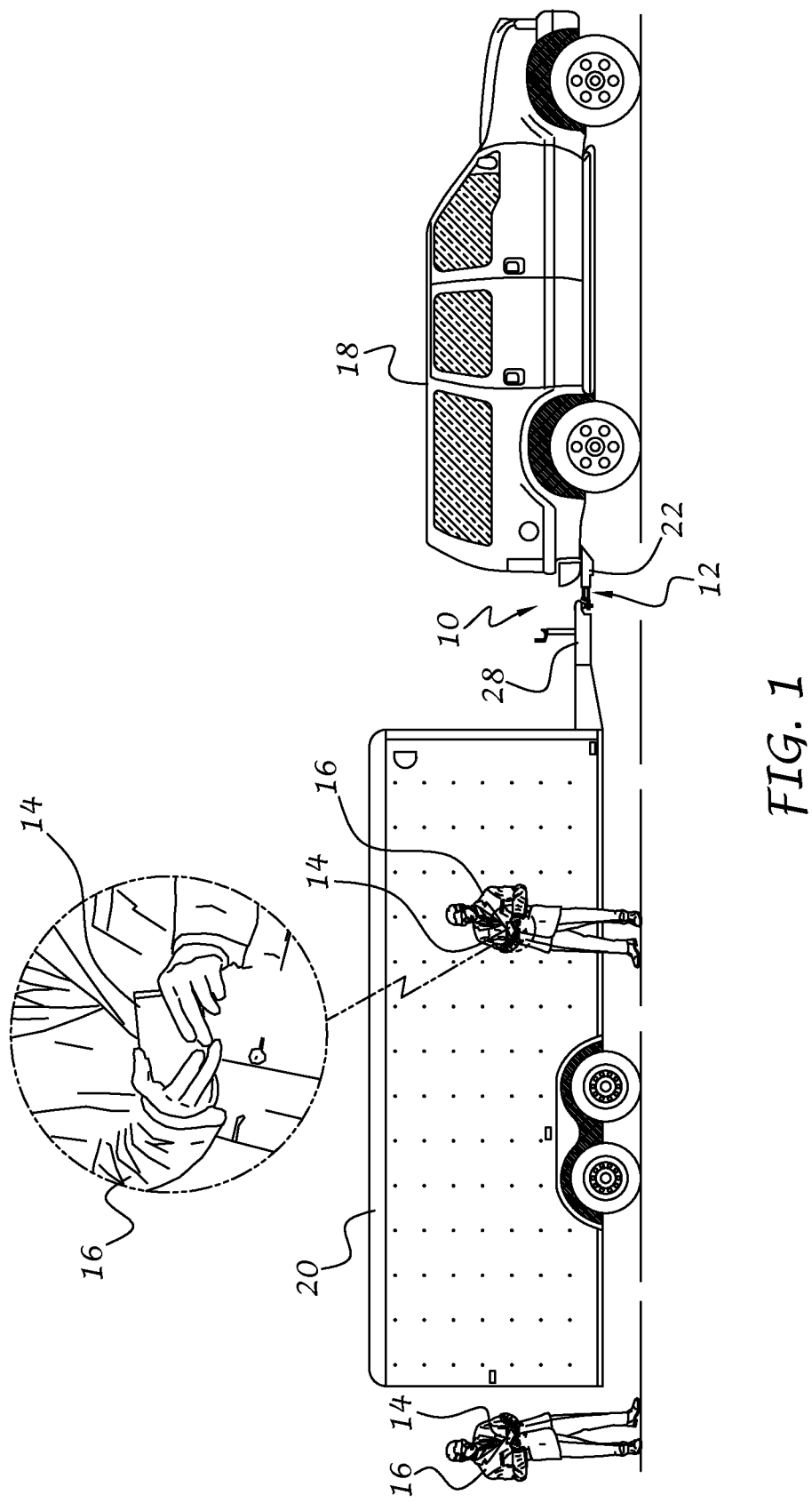
FIG. 1 is a side elevational view of a system for determining the tongue weight and other parameters of a towed vehicle in accordance with the present invention.

Referring to the drawings, and to FIG. 1 particular, a system 10 for determining the tongue weight of a towed vehicle, as well as other parameters, in accordance with the present invention is illustrated. The system 10 preferably includes a drawbar transducer 12 and a remote display unit 14 which can be carried by a user 16 to remotely read the tongue weight of the towed vehicle, preferably while connected between a towing vehicle 18 and a towed vehicle 20. The wireless transmission of measurement data between the drawbar transducer 12 and display 14 ensures that the user 16 can be located at different locations to monitor the tongue weight as illustrated in FIG. 1 by the different positions of the user 16. In this manner, the loading, unloading and shifting of contents within the towed vehicle can be closely monitored to ensure that the proper tongue weight is obtained for a particular gross vehicle weight rating (GVWR) of the towed vehicle as well as the rated tow capacity of the towing vehicle.

With additional reference to FIG. 2, the drawbar transducer 12 is shown embodied as a hitch bar that is removably mounted in a receiver hitch 22 of the towing vehicle 18 (FIG. 1) via a hitch pin 24 that extends through the receiver hitch 22 and the drawbar transducer. A hitch ball 26 is connectable to the drawbar transducer 12 for coupling the drawbar transducer with the tongue 28 (FIG. 1) of the towed vehicle 20 to thereby connect the vehicles 18, 20 together. When not in use, or when it is desirous to determine the tongue weight of another towed vehicle and/or to use another towing vehicle, the drawbar transducer 12 can be uncoupled from the trailer tongue 28 and removed from the receiver hitch 22 by removing the hitch pin 24 and sliding the drawbar transducer 12 out of the receiver hitch 22.

Referring now to FIGS. 3-7, the drawbar transducer 12 preferably includes a transducer body 30 with a forward coupling section 32, an intermediate sensing section 34, and a rear mounting section 36. The forward coupling section 32 preferably includes a platform 38 that extends forwardly from the sensing section 34 and an opening 40 that extends through the platform 38 for receiving the shank 42 of the hitch ball 26 in a well-known manner. A nut 45 (FIG. 5) secures the hitch ball 26 to the platform 38. An inclined wall 44 extends upwardly and rearwardly from the platform 38 to provide clearance for the hitch ball 26 and trailer tongue 28 when coupled to the hitch ball. It will be understood that the coupling section 32 is not limited to a hitch ball arrangement but may be configured to accommodate any coupling requirement of the towed vehicle.

The intermediate sensing section 34 is preferably defined by a top wall 46, bottom wall 48, and a forward upright measurement wall or web 50 that extends centrally between the top and bottom walls to thereby form a generally I-beam shape in cross-section, as shown in FIG. 6.

Likewise, the rear mounting section 36 is preferably defined by the top wall 46, bottom wall 48, and a rearward upright wall or web 52 that extends centrally between the top and bottom walls to form a generally I-beam-shaped cross-section, as shown in FIG. 7. In accordance with an exemplary embodiment of the invention, the width of the top and bottom walls is approximately two inches and the combined height of the upright walls and thickness of the top and bottom walls is approximately two inches so that the rear mounting section 36 can fit within a 2"×2" Class III or Class IV receiver hitch. However, it will be understood that the drawbar transducer 12 as well as the mounting section 36 can vary in size and configuration to fit different receiver hitch sizes and different towing vehicle hitch types without departing from the spirit and scope of the invention. Moreover, although inclined wall 44 of the coupling section 32 is shown as greater in height and width than the sensing and mounting sections, it will be understood that the inclined wall can be dimensioned to be flush with the top and bottom walls 46 and 48, respectively.

Pillars 54 and 55 preferably extend between the top wall 46 and bottom wall 48 on either side of the transducer body 30 and separate the sensing section 34 from the mounting section 36. The pillars 54 and 55 are located at a longitudinal position along the transducer body 30 to coincide with the position that the transducer body exits the receiver hitch 22 to strengthen the drawbar transducer against bending stress when the trailer tongue 28 (FIG. 1) is coupled to the hitch ball 26. The curved front surface 56 and curved rear surface 58 of the pillars ensure that compressive forces on the front surface and tensile forces on the rear surface are equally distributed along the height of the pillars when the transducer body 30 is under load. The intermediate sensing section 34 is thus bounded by the inclined wall 44 and pillars 54, 55, while the rear mounting section 36 is bounded by the pillars and a rear wall 60 that extends between the top wall 46 and bottom wall 48.

As best shown in FIGS. 4, 6, and 6A and 6B, the upright measurement wall 50 has a first thickness T1 that, together with the upper and lower walls, defines a pair of compartments 76 and 78 on opposite sides of the upright wall 50 for receiving and protecting a sensor electronics section 80, as shown in FIG. 6, besides reducing the amount of material needed to manufacture the drawbar transducer 12.

Recessed sensor areas 62 and 64 are preferably formed in opposite sides of the upright measurement wall 50 in the compartments to create a second thickness T2 which is smaller than the first thickness T1. Strain gauges 66 and 68 are preferably located centrally in the recesses 62 and 64, respectively. Each strain gauge 66, 68 preferably includes dual element strain sensors 70, 72 that are angled at approximately 90 degrees from each other to measure shear stresses in the recesses 62 and 64. Preferably, both of the strain gauges are oriented vertically, or parallel with the strain axis (with the strain sensors 70, 72 angled at 45 degrees with respect to vertical) to sense the shear stresses caused by a vertical load on the hitch ball 26.

In accordance with another preferred embodiment of the invention, one of the strain gauges, such as strain gauge 68, is oriented horizontally, or perpendicular to the strain axis (with the strain sensors 70, 72 angled at 45 degrees with respect to horizontal) to serve as reference sensors, as shown in FIG. 6B.

In either embodiment, the sensors 70, 72 of the strain gauges 66, 68 are preferably connected in a bridge circuit (not shown) and sent to a processor 74 (FIG. 20) for determining the vertical force on the hitch ball 26, and thus the tongue weight. The recessed sensor areas 62 and 64 can be filled with a resilient potting material to protect the strain gauges and their delicate wire leads from harsh environmental conditions.

Since, according to the second preferred embodiment, one of the sensors is oriented perpendicular to the shear axis (FIG. 6B) for vertical loads, it is contemplated that fore and aft as well as lateral loads can also be measured. For example, it may be desirous for the operator of a towing vehicle to know if the towing characteristics of the towed vehicle have changed. In this regard, when one or more tires of the towed vehicle experience a loss of air pressure, the average pulling forces on the hitch ball will change over time. This characteristic change can be relayed to the operator for the necessary intervention (see for example the displayed warning 238 in FIG. 19). Moreover, by measuring the fore and/or aft forces during acceleration and/or braking, the weight of the trailer or other towed vehicle can be calculated without the use of a weighing scale. Calculation of the towed vehicle weight will be described in greater detail below. In addition, measuring the fore and aft forces, such as when braking, makes it possible to determine a braking force that can be automatically applied to electrically-operated trailer brakes to prevent jackknifing, delayed stops, and locking of the trailer wheels during hard braking. When the towing vehicle and trailer are parked on an inclined surface, the lateral forces can be used to adjust the measured tongue weight.

The provision of the upright measurement wall with a first thickness T1 and a second thickness T2 that is thinner than the first thickness advantageously ensures that substantially the full measurement range of the strain gauges can be utilized without compromising the integrity of the drawbar transducer 12. Accordingly, greater measurement accuracy over a wide range of vertical loads can be achieved. By way of example, instead of being resigned to an inaccurate reading as much as 20 pounds force (lbf) or more over a range of 0-500 lbf tongue weight in accordance with prior art solutions, an exemplary embodiment of the present invention is capable of displaying a range of 0-1,500 lbf tongue weight in approximately one pound-force (lbf) increments, once properly calibrated, at a cost that is well below highly accurate transducers of different configurations used in other precise measurement applications unrelated to trailer tongue weight measurement.

In accordance with one exemplary embodiment of the invention, and as shown in FIG. 6, the drawbar transducer 12 has a height H of about 2 inches, a width W of about two inches, top and bottom wall thickness H1 and H2 of about 0.235 inch, an upright wall first thickness T1 of about 0.400 inch, an upright wall second thickness T2 of about 0.100 inch created by the recessed sensor areas 62 and 64, and a one-inch diameter recess for the sensor areas 62 and 64. When the drawbar transducer 12 is constructed of an aluminum material, such as AL 6061 or 7075 with a T6 heat treatment, a strain measurement zone in the upright measurement wall 50 of the sensor areas 62 and 64 returned values in the range of zero strain to approximately the maximum safe strain of the strain sensors with stresses well below the yield stress of the material, thereby maximizing the safe measurement bandwidth of the strain gauges without compromising the structural integrity of the drawbar transducer 12. Thus, the provision of an upright measurement wall 50 with the thicker stress bearing area and the thinner strain measurement area ensures measurement accuracy while preserving the integrity of the drawbar transducer 12 under high loads. In addition, the configuration as described and shown provides easy access for mounting the strain gauges on the drawbar transducer and facilitates other assembly requirements.

It will be understood that the various dimensions set forth in the exemplary embodiment can be adjusted depending on the material used for the drawbar transducer 12, the heat treatment properties of the material, the types of strain gauges used, the maximum tongue weight to be measured, the size of the receiver hitch 22, and so on. For example, since carbon steel generally has greater yield strength than many aluminum materials, the thickness T2 of the upright wall 50 may be less for a drawbar transducer made of steel than aluminum in order to obtain the same measurement bandwidth over the same load range. Conversely, when it is desired to determine a greater tongue weight than mentioned in the exemplary embodiment, the thickness T2 of the upright wall 50 may be greater in order to maintain the same measurement bandwidth. In addition, it will be understood that the sensor areas 62 and 64 are not limited by circular recesses but may embody other shapes such as square, triangular, hexagonal, and so on (see for example FIG. 15). It will be further understood that a single sensor area can be formed in the upright wall and/or only one strain gauge or strain sensor can be used in conjunction with other compensating electronics to determine the trailer tongue weight without departing from the spirit and scope of the invention.

Figure 4:
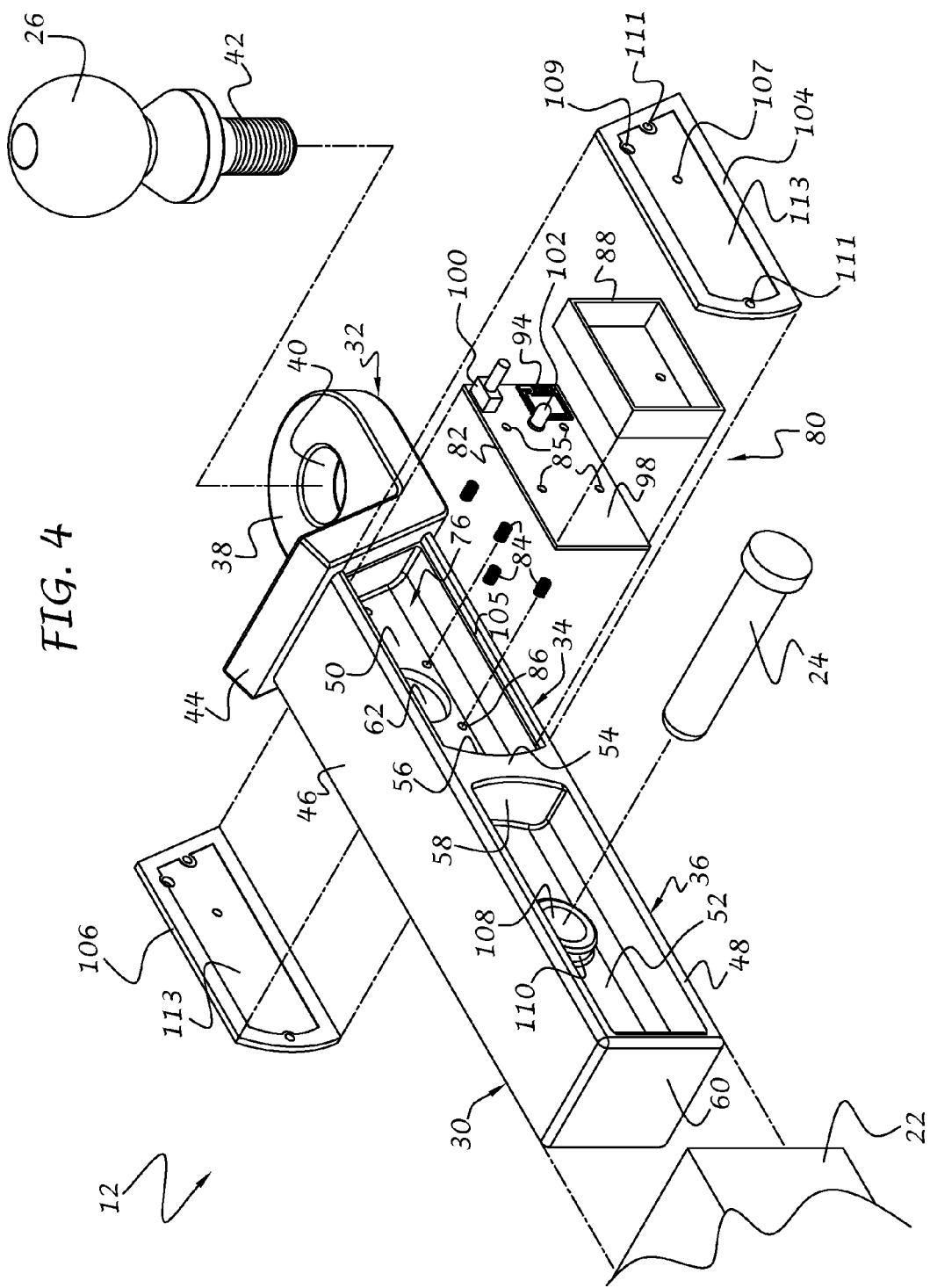
FIG. 4 is a rear isometric exploded view of the drawbar transducer in accordance with the invention.
Figure 10:
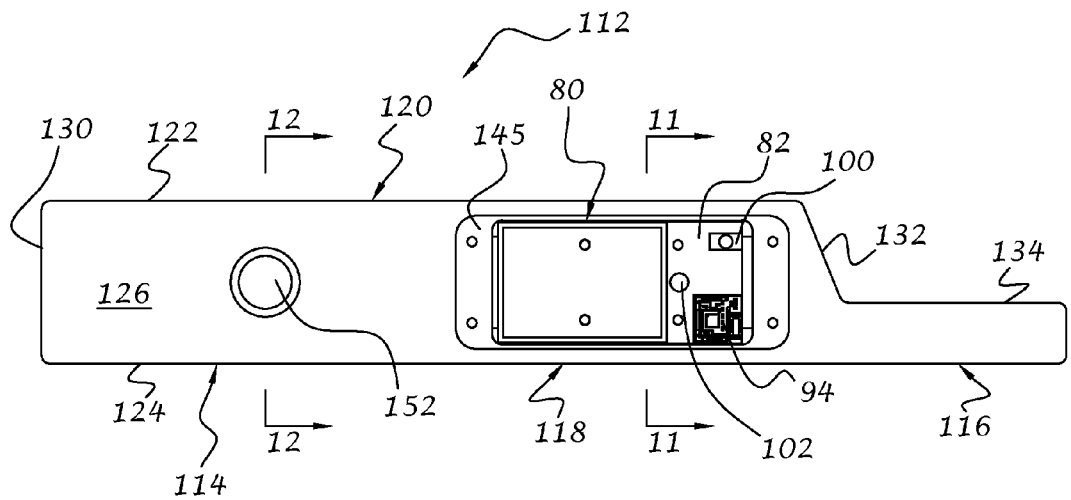
FIG. 10 is a left side elevational view of the drawbar transducer of FIG. 8.

As shown in FIGS. 2, 4 and 6, the sensor electronics section 80 preferably includes a printed circuit board (PCB) 82 mounted in the compartment 76 of the sensing section 34. Resilient spacers or stand-offs 84 extend between the PCB 82 and the upright wall 50 to isolate the PCB from stresses that may otherwise be induced by the transducer body 30 under an applied load from the trailer tongue 24 (FIG. 1). In accordance with one embodiment of the invention, the spacers comprise compression springs. However, it will be understood that any resilient or semi-rigid stand-off can be used that isolates the PCB from the transducer body 30. Fasteners (not shown) preferably extend through holes 85 in the PCB 82, the spacers 84, and into threaded apertures 86 formed in the wall 50 to mound the PCB 82 to the wall 50. A small opening (not shown) is formed in the upright wall 50 so that electrical conductors 69 (FIG. 6) from the strain sensor 68 can pass through the wall 50 for connection to the PCB 82. A battery holder 88 is preferably electrically connected to the PCB and is of minimal height to fit within the compartment 76. Batteries (not shown) can be loaded into the battery holder to function as a power supply 90 (FIG. 20) for powering the electronics. Although the PCB has been shown mounted on the left side of the transducer body 30, it will be understood that the PCB can be mounted on either side.

Figure 19:
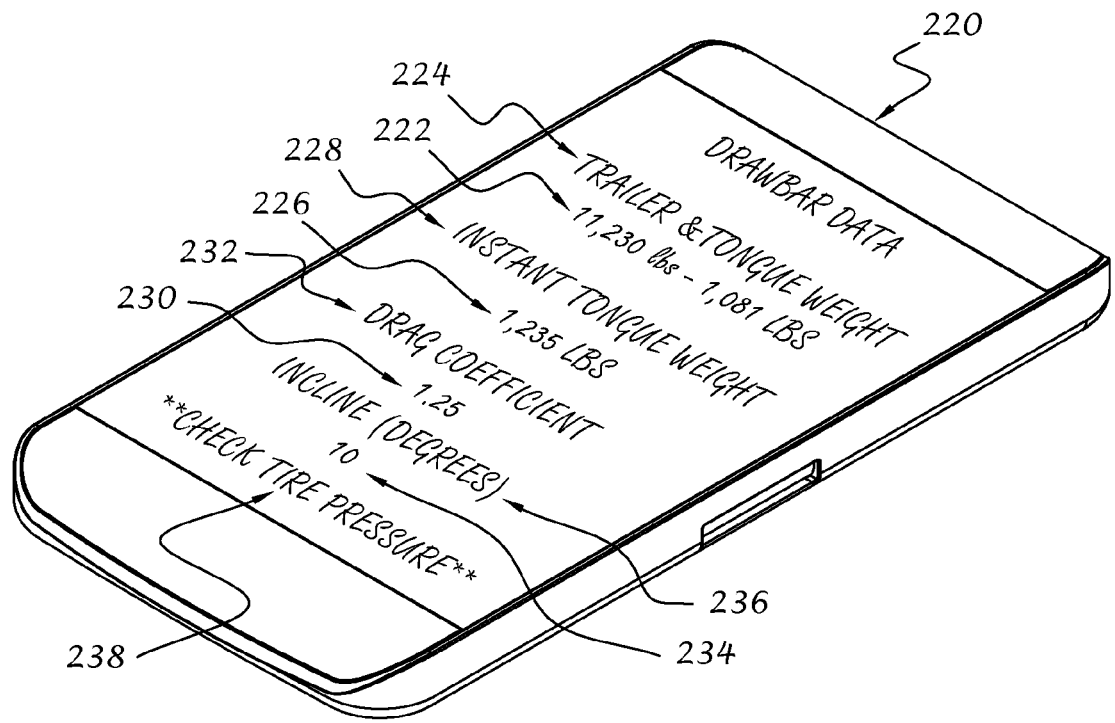
FIG. 19 is an isometric view of a remote display in accordance with a further embodiment of the invention.
Figure 20:
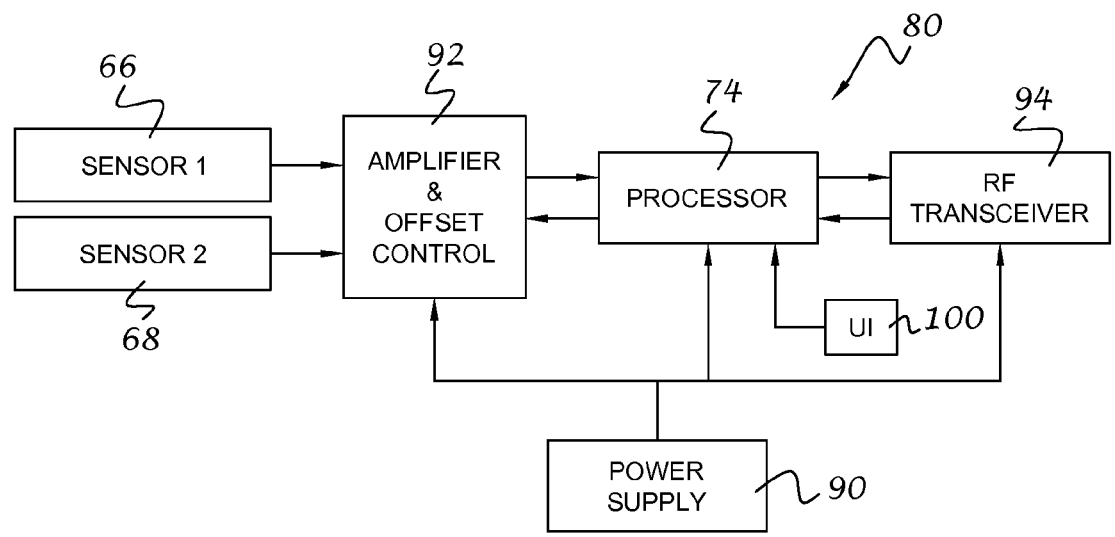
FIG. 20 is a block diagram illustrating major electronic components of the drawbar transducer.

With additional reference to FIG. 20, other components on the PCB preferably include amplifier and offset control circuitry 92 that interfaces between the processor 74 and strain gauges 66, 68 for conditioning the signals from the sensors prior to being received and processed within the processor 74. It will be understood that the amplifier and offset control circuitry 92 may alternatively form part of the processor software or may be eliminated without departing from the spirit and scope of the invention. A radio frequency (RF) transceiver 94 is also connected to the processor 74 for sending signals to the display electronics section 96 (FIG. 21) of the remote display unit 14 (FIGS. 1, 18 and 19) indicative of the tongue weight as determined by the sensor electronics section 80. The transceiver 94 can also receive signals from the remote display unit 14 for initiating various functions such as remotely turning on and off the sensor electronics section 80, verifying the receipt of transmitted information, and so on.

As shown in FIG. 4, the RF transceiver 94 is preferably located on the outward face 98 of the PCB and is spaced from the walls 50, 44, 46, and 48 of the transducer body 30 to minimize RF interference and maximize the distance over which the signals can be transmitted. A user input, such as push-button switch 100 (see also FIG. 20), is also mounted on the outward face 98 of the PCB 82 and extends outwardly for manipulation by a user to selectively turn on and off the drawbar transducer as well as other functions, including but not limited to, entering a learn mode to couple the drawbar transducer 12 with a particular remote display unit 14, entering a tare function to zero out the currently determined tongue weight, and so on. A light source 102, such as a LED, can be provided for indicating the different operational modes of the sensor electronics section 80 by employing different flash rates and/or colors for each mode. The transceiver 94 can also receive signals from the remote display unit 14 for initiating various functions such as remotely turning on and off the sensor electronics section 80, verifying the receipt of transmitted data, and so on.

Covers 104 and 106 are preferably positioned over the compartments 76 and 78 (FIG. 6), respectively, to enclose the sensor electronics section 80, including the strain gauges 66 and 68. Preferably, the covers 104, 106 fit within a depression 105 that surrounds each compartment 76, 78 so that the covers are flush with the upper and lower walls 46, 48. One or both covers can be removable for accessing the electronics section, including the battery holder 88 to replace the batteries when disposable batteries are used. The covers are preferably constructed of plastic or other material that is transparent to RF waves so that RF interference is minimized. An aperture 107 in the cover 104 is aligned with the LED 102 for indicating to a user when the drawbar transducer 12 is in operation. An aperture 109 in the cover is aligned with the switch 100 so that the switch is accessible to a user. Other openings 111 formed in the cover are for mounting the cover to the drawbar via fasteners or the like. A depression 113 formed in the cover is adapted for receiving a user warning label or the like. In order to reduce costs, the covers 104, 106 can be similar in construction, with or without one or more of the apertures and openings.

Referring now to FIGS. 3 and 7, the rear mounting section 36 preferably includes a hole 108 that extends through the rear upright wall 52 for receiving the hitch pin 24. An annular boss or collar 110 is concentric with the hole 108 and extends laterally outwardly from both sides of the upright wall 52 for reinforcing the area surrounding the hole 108.

Turning now to FIGS. 8-12, a drawbar transducer 112 in accordance with a further embodiment of the invention is illustrated. The drawbar transducer 112 is somewhat similar in construction to the drawbar transducer 12 previously described, and preferably includes a transducer body 114 with a forward coupling section 116, an intermediate sensing section 118, and a rear mounting section 120. The transducer body 114 is preferably machined from a single block of material, such as aluminum or steel, and includes a top surface 122, a bottom surface 124, a left side surface 126, a right side surface 128, a rear surface 130, and a front inclined surface 132. However, it will be understood that the transducer body 114 can be formed by die-casting, sand casting, or any known forming means without departing from the spirit and scope of the invention.

In accordance with an exemplary embodiment of the invention, the width between the surfaces 126 and 128 and the height between the surfaces 122 and 124 are each approximately two inches so that the rear mounting section 120 can fit within a 2"×2" Class III or Class IV receiver hitch. However, it will be understood that the width and height of the drawbar transducer 112 as well as the particular shape or configuration can vary to fit different receiver hitch sizes and/or different hitch requirements of the towing vehicle without departing from the spirit and scope of the invention.

The forward coupling section 116 preferably includes a platform 134 that extends forwardly from the sensing section 118 and an opening 136 that extends through the platform 134 for receiving the shank 42 of the hitch ball 26 (FIG. 5) in a well-known manner. The inclined surface 132 extends upwardly and rearwardly from the platform 134 to provide clearance for the hitch ball 26 and trailer tongue 28 when coupled to the hitch ball. As in the previous embodiment, the coupling section 116 can be configured to accommodate any coupling requirement of the towed vehicle.

Figures 11, 12:
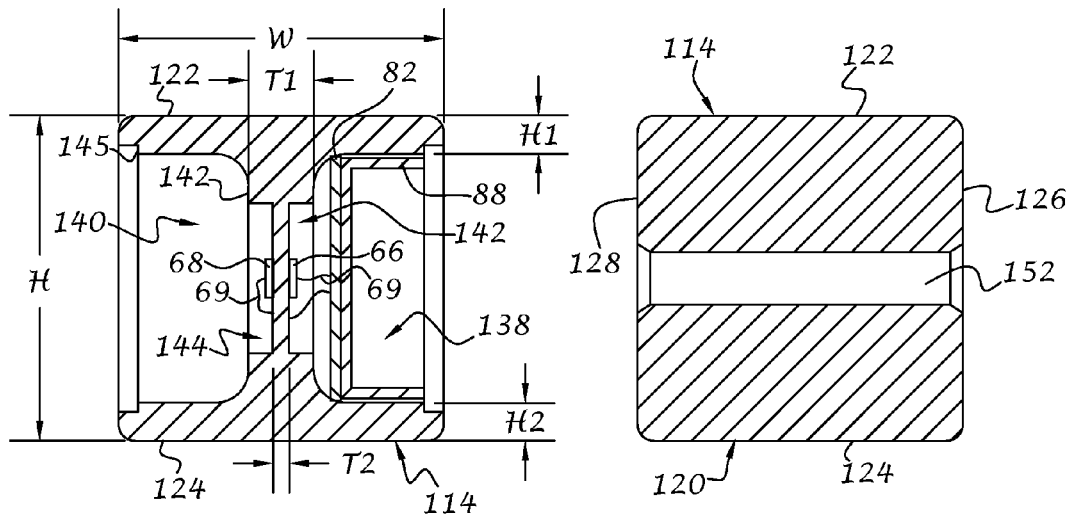
FIG. 11 is a sectional view of the drawbar transducer taken along line 11-11 of FIG. 8.
FIG. 12 is a sectional view of the drawbar transducer taken along line 12-12 of FIG. 8.

The intermediate sensing section 118 is preferably similar in construction to the sensing section 34 previously described, and includes a first compartment 138 formed in the wall 126 and a second compartment 140 formed in the wall 128 opposite the first compartment for receiving and protecting sensor electronics section 80, as shown in FIGS. 8-11, besides reducing the amount of material needed to manufacture the drawbar transducer 112. An upright measurement wall or web 142 with a first thickness T1 preferably extends centrally between the first and second compartments to form a generally I-beam shape in cross-section, as shown in FIG. 11. Recessed sensor areas 142 and 144 are preferably formed in opposite sides of the upright measurement wall 142 in the compartments 138 and 140, respectively, to create a second thickness T2 which is thinner than the first thickness T1. Strain gauges 66 and 68 are preferably located centrally in the recesses 142 and 144, respectively, as in the previous embodiment. A depression 145 is preferably formed in each side wall 126, 128 surrounding each cavity for receiving a cover (not shown for clarity), such as cover 104, 106 (FIG. 4 of the previous embodiment) to hermetically seal the cavities, and thus the electronics section, from environmental conditions. Threaded apertures 150 (FIG. 13) can be provided for receiving fasteners (not shown) that extend through the covers for removably connecting one or both covers to the drawbar transducer 112.

Figure 13:
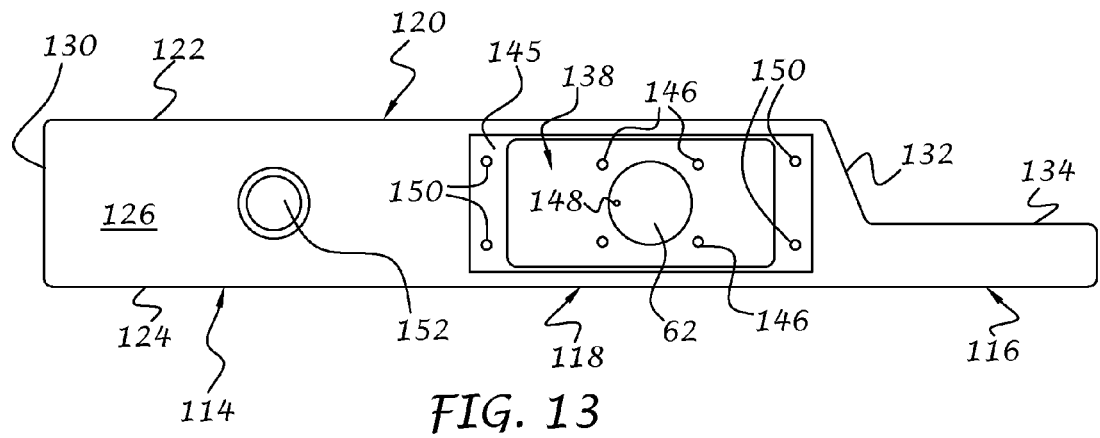
FIG. 13 is a left side elevational view of the transducer body of the FIG. 8 drawbar transducer.

As shown in FIG. 13, each recessed area is preferably circular in shape and extends across a substantial height of the upright measurement wall 142 within each compartment. Threaded apertures 146 can be formed in the upright wall 142 for receiving fasteners (not shown) to mount the PCB 82 (FIG. 9) within the compartment 138, although the PCB can alternatively be mounted in the compartment 140. A small opening 148 is formed in the upright wall 142 so that electrical conductors 69 (FIG. 11) from the strain sensor 68 can pass through the wall 142 for connection to the PCB 82 (FIG. 11).

As best shown in FIGS. 8, 9 and 12, the rear mounting section 120 is preferably solid in construction with the exception of a hole 152 that extends through the transducer body 114 between the side surfaces 126 and 138 for receiving a hitch pin, such as hitch pin 24 shown in FIG. 4, for securing the drawbar transducer 112 to the receiver hitch of a vehicle.

Figure 14:
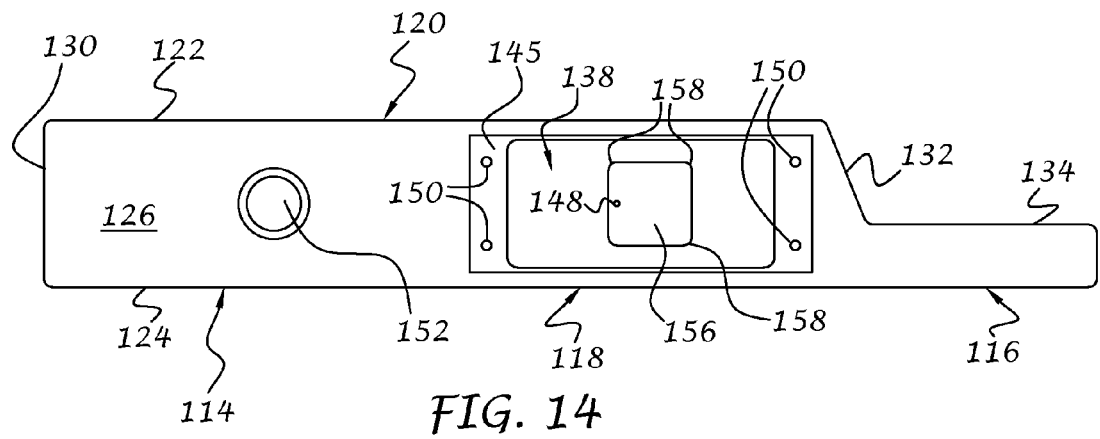
FIG. 14 is a left side elevational view of a transducer body in accordance with a further embodiment of the invention.

Turning now to FIG. 14, a drawbar transducer body 154 in accordance with a further embodiment of the invention is illustrated. The transducer body 154 is similar in construction to the transducer body 114 previously described, with the exception that the recessed sensor area 156 on one or both sides of the transducer body 154 is of a generally square shape. The corners 158 of the sensor area 156 are preferably rounded to distribute stress more uniformly thereby avoiding high stress points.

Figure 15:
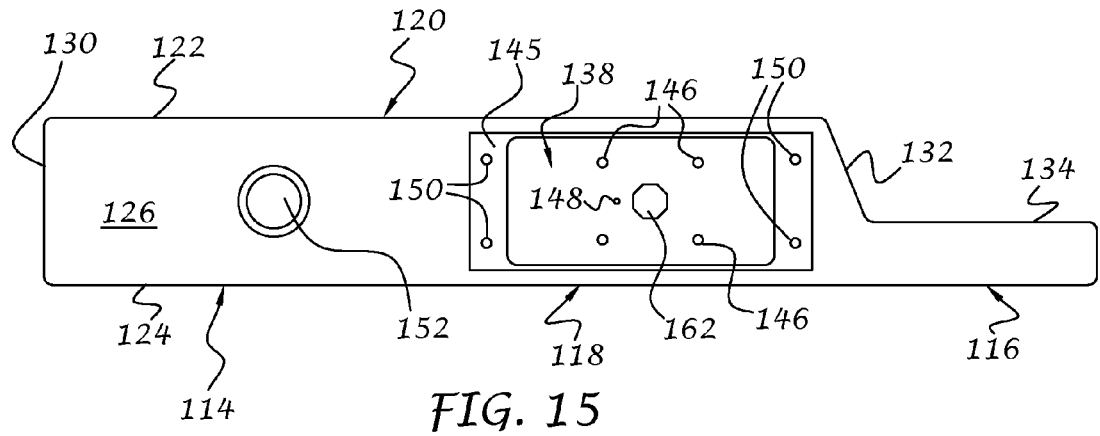
FIG. 15 is a left side elevational view of a transducer body in accordance with another embodiment of the invention.

Turning now to FIG. 15, a drawbar transducer body 160 in accordance with a further embodiment of the invention is illustrated. The transducer body 160 is similar in construction to the transducer body 114 previously described, with the exception that the recessed sensor area 162 on one or both sides of the transducer body 160 is generally of an octagonal shape and is much smaller in area than the sensor areas of the previous embodiments.

Accordingly, it will be understood that one or more recesses for receiving one or more strain sensors for sensing the weight of a trailer tongue can be of different shapes and sizes without departing from the spirit and scope of the invention.

Figure 16:
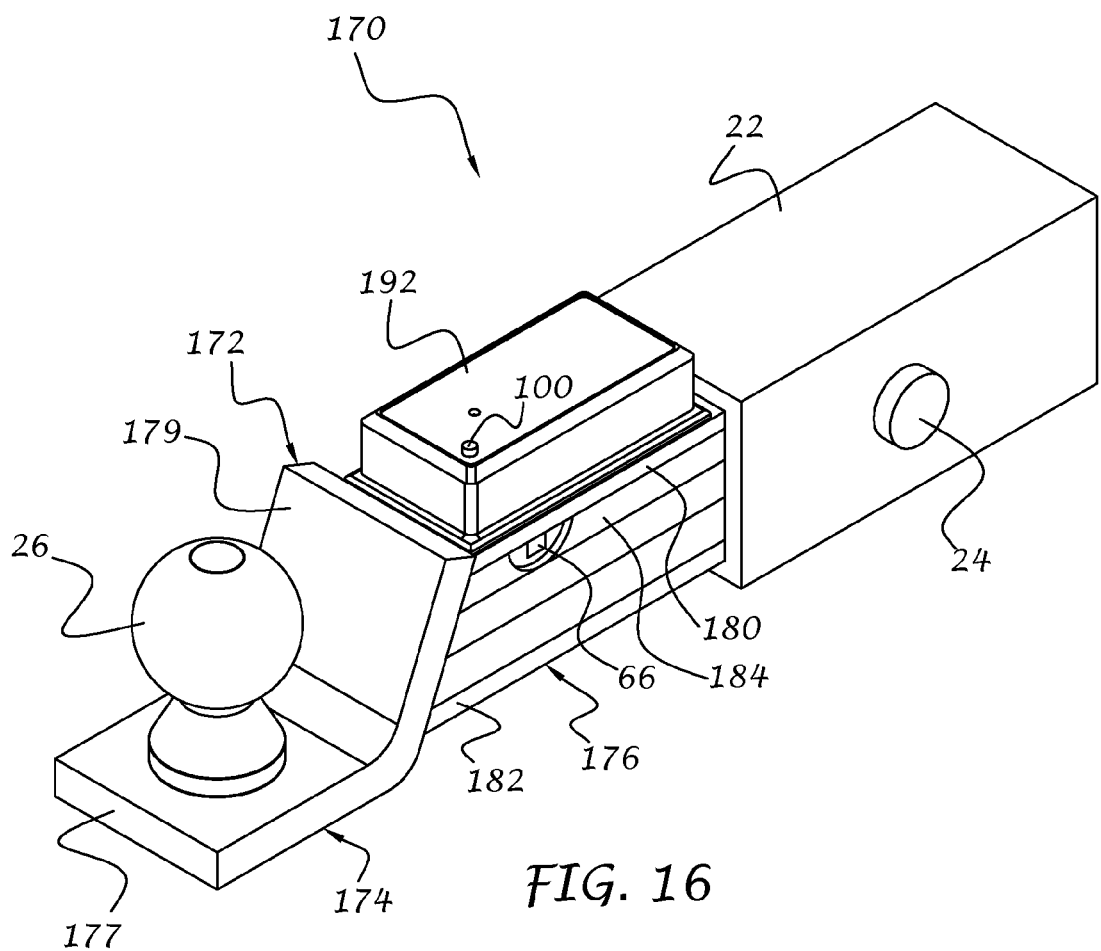
FIG. 16 is a front isometric view of a drawbar transducer for determining the tongue weight of a towed vehicle and other parameters in accordance with a further embodiment of the present invention connected to the receiver hitch of a vehicle.
Figure 17:
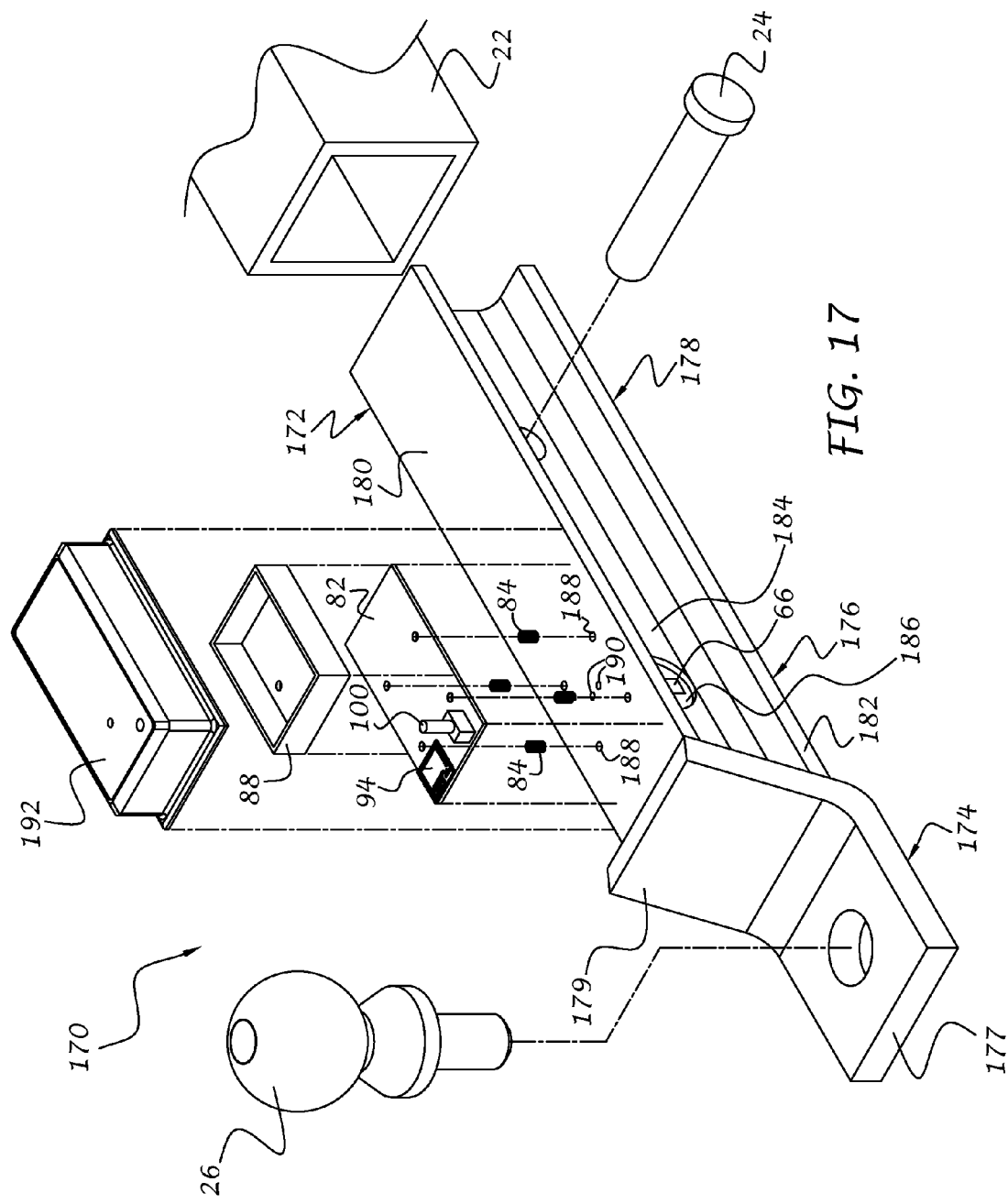
FIG. 17 is a front isometric exploded view thereof.

Referring now to FIGS. 16 and 17, a drawbar transducer 170 in accordance with a further embodiment of the invention is illustrated. The drawbar transducer 170 is somewhat similar in construction to the drawbar transducer 12 previously described, and preferably includes a transducer body 172 with a forward coupling section 174, an intermediate sensing section 176, and a rear mounting section 178. The transducer body 172, including the sensing section 176 and the mounting section 178 is preferably extruded, such as out of aluminum or steel, into the shape of an I-Beam while the forward coupling section 174 is preferably bent from a metal plate, such as aluminum or steel, and welded to the sensing section 176 to form a platform 177 for supporting a hitch ball 26 and an inclined wall 179 as in the previous embodiments.

The intermediate sensing section 176 and rear mounting section 178 are preferably defined by a top wall 180, bottom wall 182, and an upright measurement wall or web 184 that extends centrally between the top and bottom walls to form a generally I-beam shape in cross-section. In accordance with an exemplary embodiment of the invention, the width of the top and bottom walls is approximately two inches and the combined height of the upright walls and thickness of the top and bottom walls is approximately two inches so that the rear mounting section 178 can fit within a 2"×2" Class III or Class IV receiver hitch 22. However, it will be understood that the width and height of the drawbar transducer 170 can vary to fit different receiver hitch sizes without departing from the spirit and scope of the invention. Moreover, although inclined wall 179 of the coupling section 174 is shown as greater in height and width than the sensing and mounting sections, it will be understood that the inclined wall can be dimensioned to be flush with the top and bottom walls 180 and 182, respectively.

Recessed sensor areas 186 (only one shown) are preferably formed in opposite sides of the upright measurement wall 184 in the compartments to create a second thickness which is thinner than a first thickness of the upright measurement wall, as in the previous embodiments. Strain gauges 66 (only one shown) are preferably located centrally in the recessed sensor areas 186. As shown, each recessed area is preferably circular in shape and extends across a substantial height of the upright measurement wall 184 within each compartment.

The sensor electronic section 80 is preferably connected to the top wall 180 via fasteners (not shown) that extend through holes 85 in the PCB 82, the resilient spacers 84, and into threaded apertures 188 formed in the top wall 180 to mount the PCB 82 to the top wall. Small openings 190 are formed in the top wall 180 so that electrical conductors (not shown) from the strain sensors 66 can pass through the top wall for connection to the PCB 82. A removable cover 192 is also preferably connected to the top wall 180 and surrounds the electronics section 80 for protecting the electronics section from the outside environment. It will be understood that the electronics section 80 and cover 192 can be connected to the bottom wall 182 or upright wall 184 without departing from the spirit and scope of the invention.

The rear mounting section 178 preferably includes a hole 194 that extends through the upright wall 184 for receiving a hitch pin, such as hitch pin 24, for securing the drawbar transducer 170 to the receiver hitch 22 of a vehicle.

Although a power supply in the form of one or more batteries is preferred in each of the above drawbar transducer embodiments for portability and interchangeability of the drawbar transducer, the power supply can additionally or alternatively be provided by the towing vehicle's electrical trailer hook-up in accordance with a further embodiment of the invention. Accordingly, an electrical cable with appropriate terminations (not shown) can be provided to supply power to the sensor electronics section 80. The provision of electrical power from the towing vehicle can be especially advantageous when it is desirous to monitor the trailer tongue weight and other parameters during actual towing. When vehicle power supply is used, the electronics section 80 can include components and circuitry to protect the electronics section from electrical spikes, back-EMF, and other electrical anomalies commonly associated with vehicles and other equipment.

Figure 18:
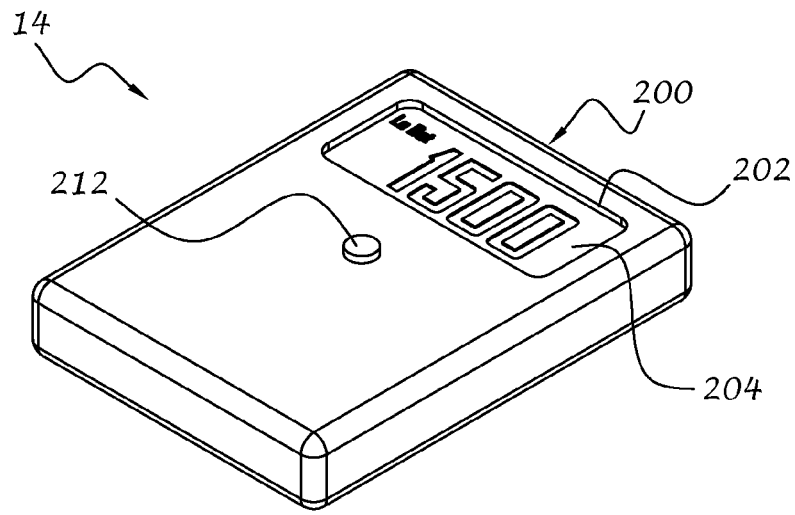
FIG. 18 is an isometric view of a remote display unit for displaying the tongue weight of a towed vehicle.
Figure 21:
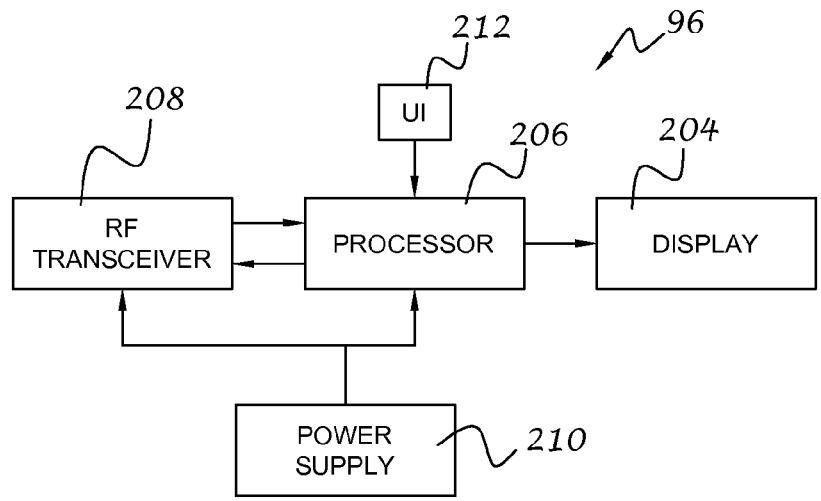
FIG. 21 is a block diagram illustrating major electronic components of the remote display unit.

Referring now to FIGS. 18 and 21, the remote display unit 14 preferably includes a housing 200 for holding the display electronics section 96 (FIG. 21). A window 202 is formed in the housing 200 for exposing a display 204 that is in turn connected to a processor 206. A RF transceiver 208 is preferably connected to the processor 206 for receiving measurement signals from one or more load bar transducers previously described. A power supply 210 is connected to the processor 206 and transceiver 208. Preferably, the power supply comprises one or more batteries so that the remote display unit 14 has portability. A user input, such as push-button switch 212, preferably extends outwardly from the housing 200 for manipulation by a user to selectively turn on and off the display 14 as well as to select other functions, including but not limited to, entering a learn mode to couple the remote display unit 14 with a particular drawbar transducer, entering a tare function to zero out the currently determined tongue weight, and so on.

The provision of a remote display that can be carried by a user, as shown in FIG. 1, is especially advantageous over prior art solutions that require the user to be next to the tongue of the trailer to determine its weight. The remote display of the present invention allows the user to be located at different locations to monitor the tongue weight so that loading, unloading and shifting of contents on or within the towed vehicle can be closely monitored without the necessity of going back and forth between the tongue and main body of the trailer so that the proper tongue weight can be obtained in practically real time. Such a provision also allows a user to constantly monitor the tongue weight and other parameters during an actual towing operation, such as determining if the load has shifted, whether or not one or more of the tires of the towed vehicle has lost pressure, and so on.

Referring now to FIG. 19, a remote display unit 220 in accordance with a further embodiment of the invention is preferably embodied as a smartphone or tablet that can communicate via Bluetooth™ technology or other wireless transmission systems and/or frequencies with the drawbar transducer. The remote display unit 220 preferably includes additional display items so that the condition of the load and/or changes in the load condition can be monitored during loading and towing.

By way of example, the actual trailer tongue weight 222 as well as the trailer weight (as will be described in greater detail below) can be displayed below the designation 224. Likewise, the instantaneous tongue weight 226 and trailer weight can be displayed below the designation 228. The instantaneous tongue weight and trailer weight may be especially important prior to towing and during towing to determine actual load on the hitch system that may occur when the towing vehicle and towed vehicle pass over bumps or other anomalies in the road surface. A drag coefficient or the like 230 can be displayed under a suitable heading 232. A drag force can be measured for example when the towing vehicle and towed vehicle are climbing or descending a hill (such as an incline measurement 234 under a suitable heading 136), during braking, wind resistance in various direction and at different speeds, and so on. Information about drag can be measured from lateral as well as fore and aft forces acting on the hitch ball as measured by the drawbar transducer. With such measured forces, it can be determined whether one or more of the above factors may be causing the drag and to what extent under normal operating conditions. If the drag is too high or too low for such conditions, then it may be determined that the tire pressure is too high to too low, as well as other mechanical conditions that might cause concern to the user. Warning messages, such as message 238, can be provided on the smart phone 220, vehicle display, or the like to alert an operator of possible problems that may need to be resolved. An understanding of what is happening to the hitch system as well as the towing vehicle and towed vehicle in real time can improve driver performance and potentially avoid catastrophic events. Such data can be gathered and processed through known data processing techniques using computer algorithms or software for various platforms and can be provided as computer readable software on various media storage devices for downloading into and operating on the smartphone, a computer, display, or the like, including but not limited to, hard drives, Internet websites, thumb drives, flash memory devices, CD's, and so on. In addition, such data can be used to determine the braking force of a towing vehicle and automatically adjust the brakes of the trailer to avoiding trailer wheel locking and its attendant consequences while maximizing braking force in the towed vehicle.

Figure 22:
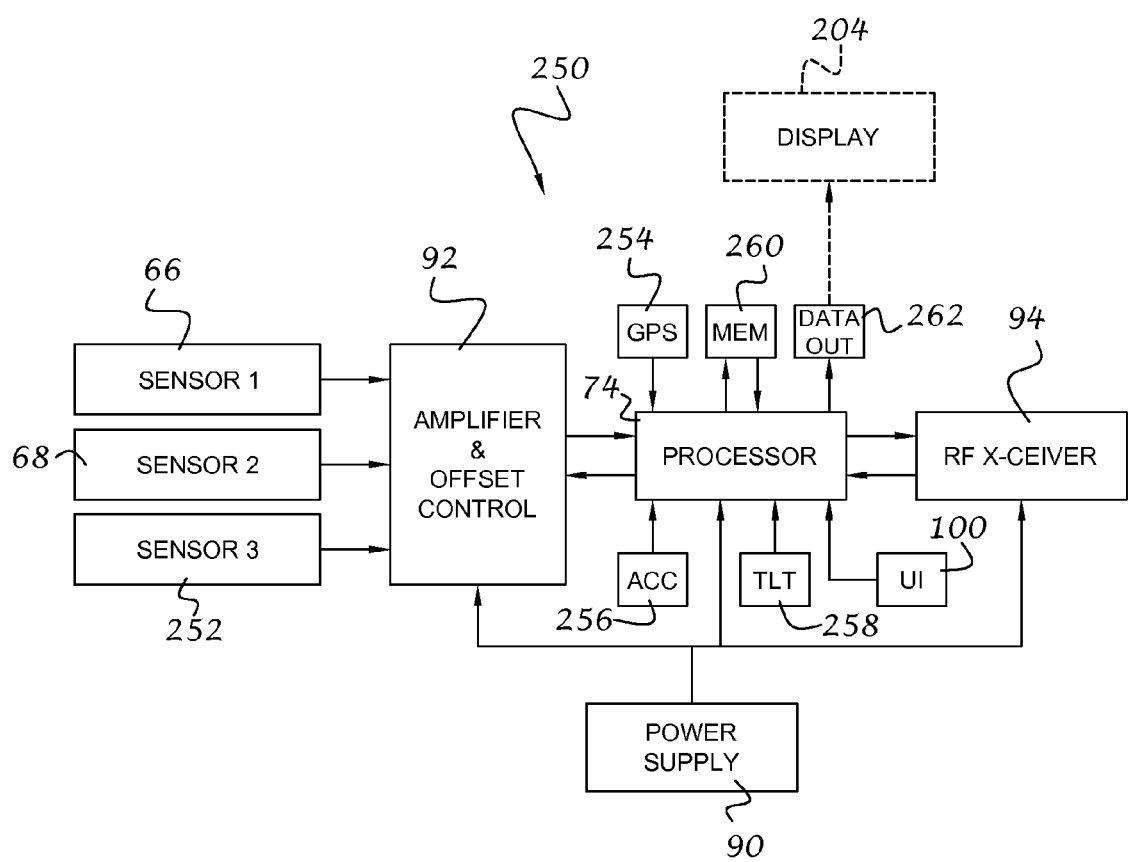
FIG. 22 is a block diagram illustrating major electronic components of the system for determining the tongue weight, towed vehicle weight, and other parameters of a towed vehicle in accordance with a further embodiment of the invention.

Turning now to FIG. 22, a sensor electronics section 250 in accordance with a further embodiment of the invention is illustrated. The sensor electronics section 250 is somewhat similar to the sensor electronics section previously described, with the addition of other electronic components. By way of example, a third strain senor 252, representative of one or more additional strain sensors, can be installed on the drawbar transducer at various locations and angles to measure fore and aft forces as well as lateral forces. A GPS unit 254 is also preferably provided to determine instantaneous velocity as well as the location of the towed vehicle at all times but more importantly during a potential catastrophic event so that the cause of the catastrophic event can be determined, whether it be driver error, mechanical error, and/or events beyond the control of the driver. An accelerometer 256 is also preferably provided to determine acceleration, deceleration, instantaneous velocity, centrifugal forces experienced while turning and/or towing through curved sections of a roadway, the weight of the towed vehicle, and so on. In this manner, automatic braking forces can be applied to the trailer brakes during a deceleration even as discussed above. In addition, the accelerometer can be used in conjunction with location and speed data from the GPS to determine if a user has exceeded the recommended safe highway speed for the towed trailer as well as excessive speeds around curved road segments in case of a catastrophic event.

A tilt sensor 258 can also be provided to determine if the towed vehicle is climbing or descending a hill and/or parked on a hill to more accurately determine and display the trailer tongue weight, trailer weight, as well as changes in drag that may occur as discussed above. The data gathered from the various sensors can be stored in a memory 260 associated with the processor 74 and a data output interface 262 can be provided in order to store, process and display the recorded data on a display, such as display 204 (shown in broken line) associated with a computer or other electronics device, or the like. This is especially advantageous for trailer rental companies whose customers have little or no experience with towing, not only to help the customer load the trailer properly, but to also monitor one or more of the various parameters as discussed above for operator safety and liability determination when a catastrophic event has occurred.

Figure 23:
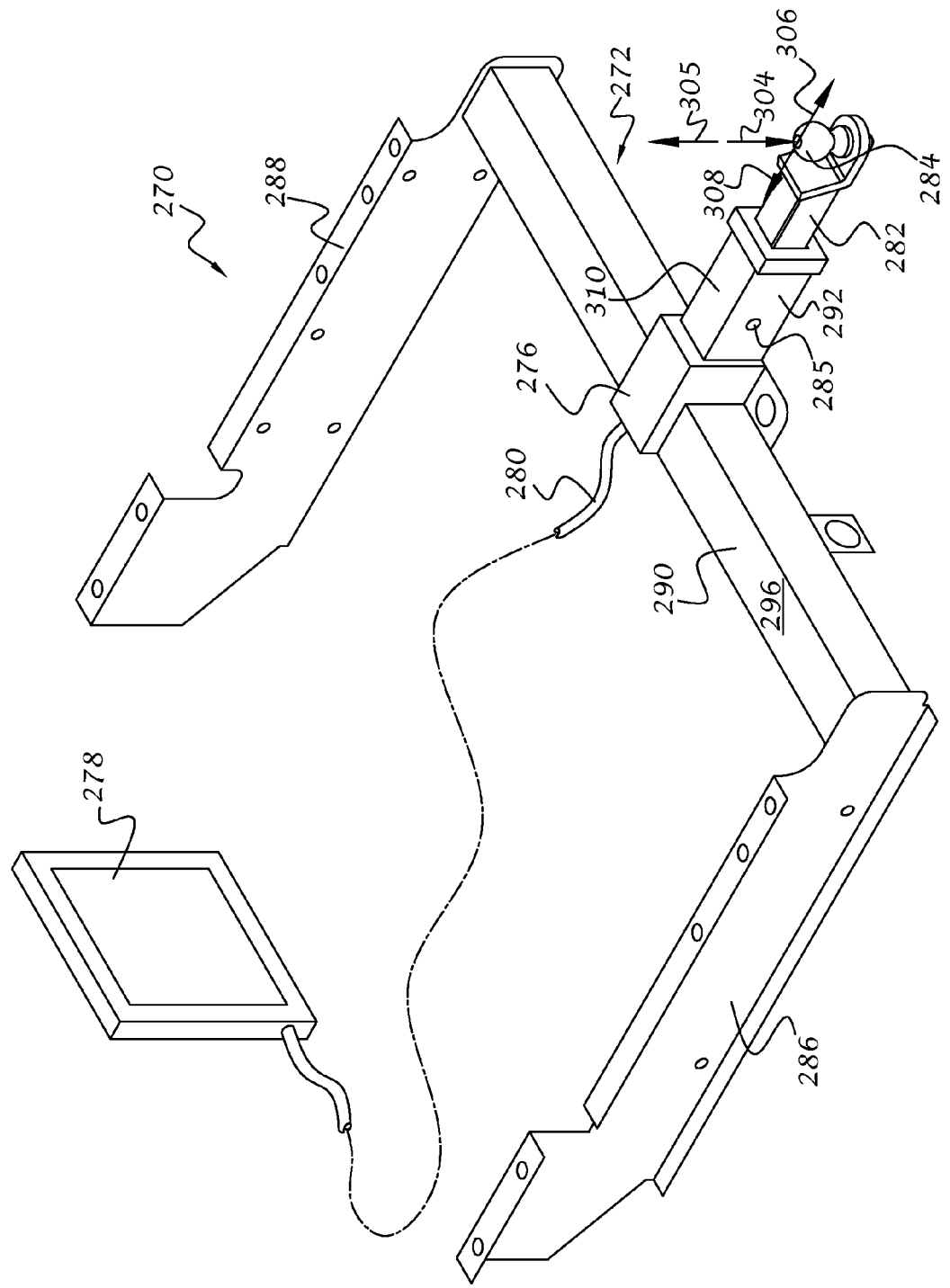
FIG. 23 is an isometric schematic view of a receiver hitch system that can form part of the system of FIG. 1 for determining the tongue weight and other parameters of a towed vehicle in accordance with a further embodiment of the present invention.
Figure 24:
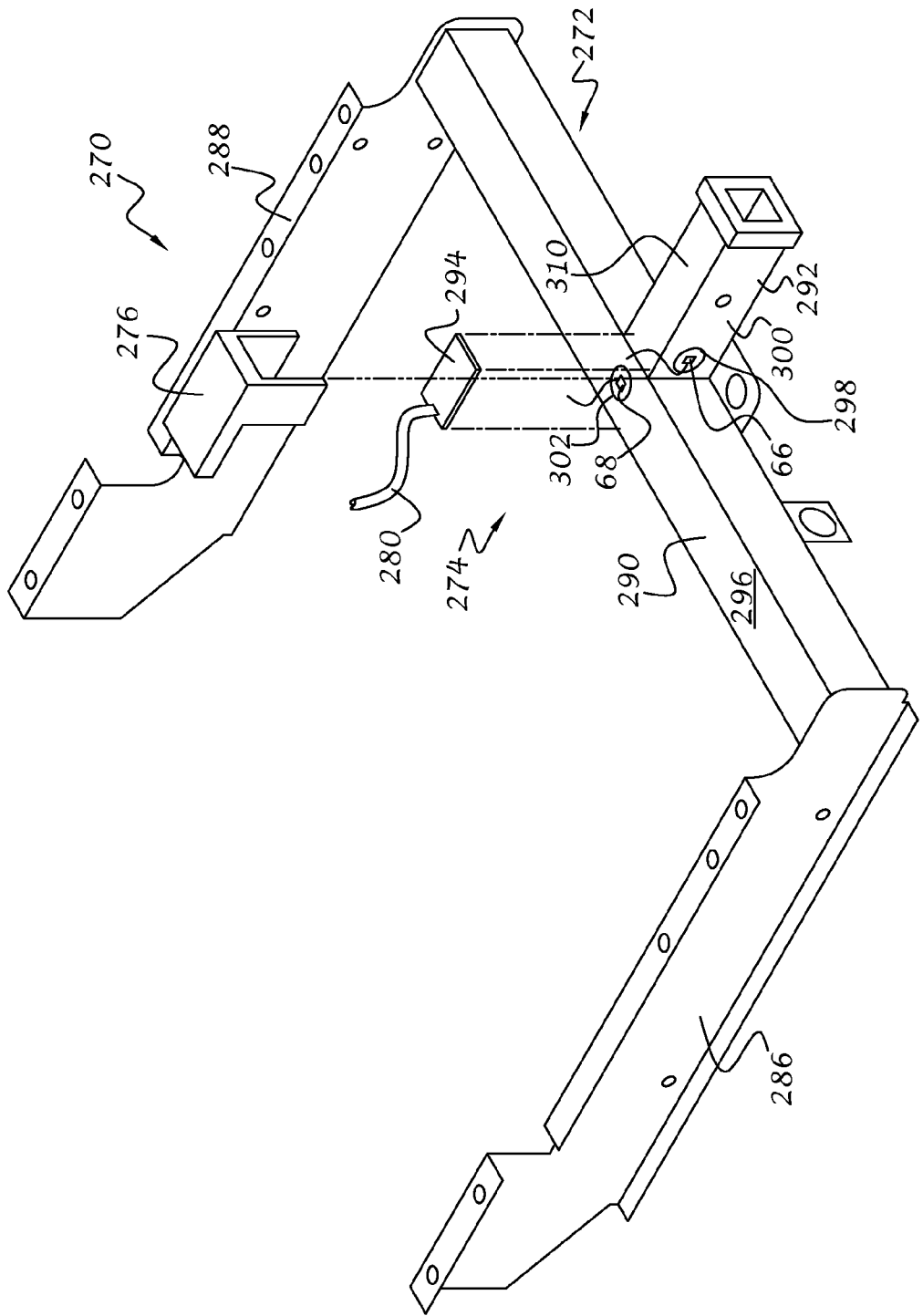
FIG. 24 is an isometric exploded view thereof with the drawbar and display being absent.

Referring now to FIGS. 23 and 24, a receiver hitch system 270 for determining various parameters of a towed vehicle is schematically illustrated. The system 270 preferably includes a receiver hitch 272, an electronics section 274 connected to the receiver hitch, a housing 276 for securing and protecting the electronics section, and a display 278 operably connected to the electronics section 274. The display 278 can be hard-wired to the electronics section, such as through a power and/or signal cable 280, or wirelessly connected thereto in a manner as previously described with respect to the prior exemplary embodiments of the invention. Power to the electronics section is preferably provided by the towing vehicle via the cable 280 since the receiver hitch is mounted on the vehicle as a permanent or semi-permanent accessory thereof, but can alternatively be provided by a separate power supply such as one or more batteries, solar cells, and so on.

The receiver hitch 272 is adapted for installation on a vehicle, such as a towing vehicle 18 shown in FIG. 1, and is adapted to receive a drawbar 282 with an installed hitch ball 284 for coupling to the tongue 28 (FIG. 1) of a trailer 20 or other vehicle adapted for towing. A hitch pin 285 extends through the drawbar 282 and receiver hitch 272 for securing the drawbar to the hitch in a well-known manner. Although the drawbar 282 may be similar in construction to the drawbar transducers of the previous embodiments, an prior art drawbar that fits within the receiver opening can be used since the electronics for measuring and determining various parameters of the towed vehicle, such as the parameters previously described, are associated with the receiver hitch 272 in accordance with the present embodiment of the invention.

The receiver hitch 272 preferably includes a left mounting bracket 286 and a right mounting bracket 288 configured for attachment to the frame or chassis of a towing vehicle in a well-known manner, a crossbar 290 extending laterally between the mounting brackets 286 and 288, and a receiver tube 292 extending rearwardly from the crossbar 290 for receiving the drawbar 282. The receiver tube 282 can be fixedly attached to the crossbar 290 by connection means such as, for example, welding, threaded fasteners, and so on. Similarly, the mounting brackets 286 and 288 can be attached to the crossbar 290 by the same connection means at the opposite ends of the crossbar 290. Although the crossbar 290 is shown as a single tubular member that extends between the mounting brackets 286, 288 for simplifying the description of the invention, it will be understood that the crossbar 290 can be constructed of multiple pieces, of solid or hollow construction, straight or bent, and have various cross sectional shapes without departing from the spirit and scope of the invention. It will be further understood that, due to the wide variety of vehicles capable of towing, the mounting brackets 286 and 288 can be of various configurations. Thus, the present invention is not limited to any particular receiver hitch configuration.

The electronics section 274 preferably includes a printed circuit board (PCB) 294 with the power and/or signal cable 280 electrically connected thereto. In the event that the electronics section 274 is powered by an independent power source and the signal information is transmitted via wireless communication to the display 278 or other device, the cable 280 can be eliminated. As shown, the PCB is preferably connected to the upper surface 296 of the crossbar 290 in such a manner that the PCB is isolated from vibration and bending forces incident on the receiver hitch 272. However, it will be understood that the PCB can be mounted on any surface of the crossbar, within the hollow interior of the crossbar, on any surface of the receiver tube 292, within the hollow interior of the or in the receiver tube, or at any other location on the hitch or towing vehicle without departing from the spirit and scope of the invention.

The electronics section further includes various components and circuitry connected to the PCB, such as shown in FIG. 22 and previously described. A strain gauge 66 is preferably located in a recess 298 formed in the side surface 300 of the receiver tube 292. Likewise, a strain gauge 68 is preferably located in a recess 302 formed in the upper surface 296 of the crossbar 290. Each strain gauge 66 and 68 preferably includes dual element strain sensors, as in the previous embodiments, that are angled at approximately 90 degrees from each other to measure shear stresses in the recesses 298 and 302. Preferably, the strain gauge 66 is oriented vertically, or parallel with the strain axis (with the strain sensors angled at 45 degrees with respect to vertical) to sense the shear stresses in the receiver tube 292 caused by a vertical load on the hitch ball 284, as represented by arrows 304 and 305 in FIG. 23. Likewise, the strain gauge 68 is preferably oriented horizontally, or parallel with the strain axis (with the strain sensors angled at 45 degrees with respect to the fore and aft direction) to sense the shear stresses in the crossbar 290 caused by a horizontal load, and more particularly by fore and aft loads on the hitch ball 284, as represented by arrows 306 and 308 in FIG. 23.

In accordance with another preferred embodiment of the invention, a further strain gauge, such as "SENSOR 3" denoted by numeral 252 in FIG. 22, can be fixedly mounted to the top surface 310 of the receiver tube 292 to measure lateral forces perpendicular to the fore and aft forces acting on the crossbar 290.

As in the previous embodiments, more than one strain gauge can be used for measuring each of the above-mentioned directional forces. By way of example, a further strain gauge 66 can be mounted on the opposite side of the receiver tube 292 while a further strain gauge 68 can be mounted on the lower surface of the crossbar 280. The signals from the strain gauge(s) 66 can be connected in a circuit and sent to the processor 74 (FIG. 22) for determining the vertical force on the hitch ball 26, and thus the tongue weight. Likewise, the signals from the strain gauge(s) 68 can be connected in a circuit and sent to the processor 74 for determining the fore and aft forces on the hitch ball 26, and thus the pulling load of the towed vehicle. The recesses 298 and 302 can be filled with a resilient potting material to protect the strain gauges and their delicate wire leads from harsh environmental conditions.

Figure 25:
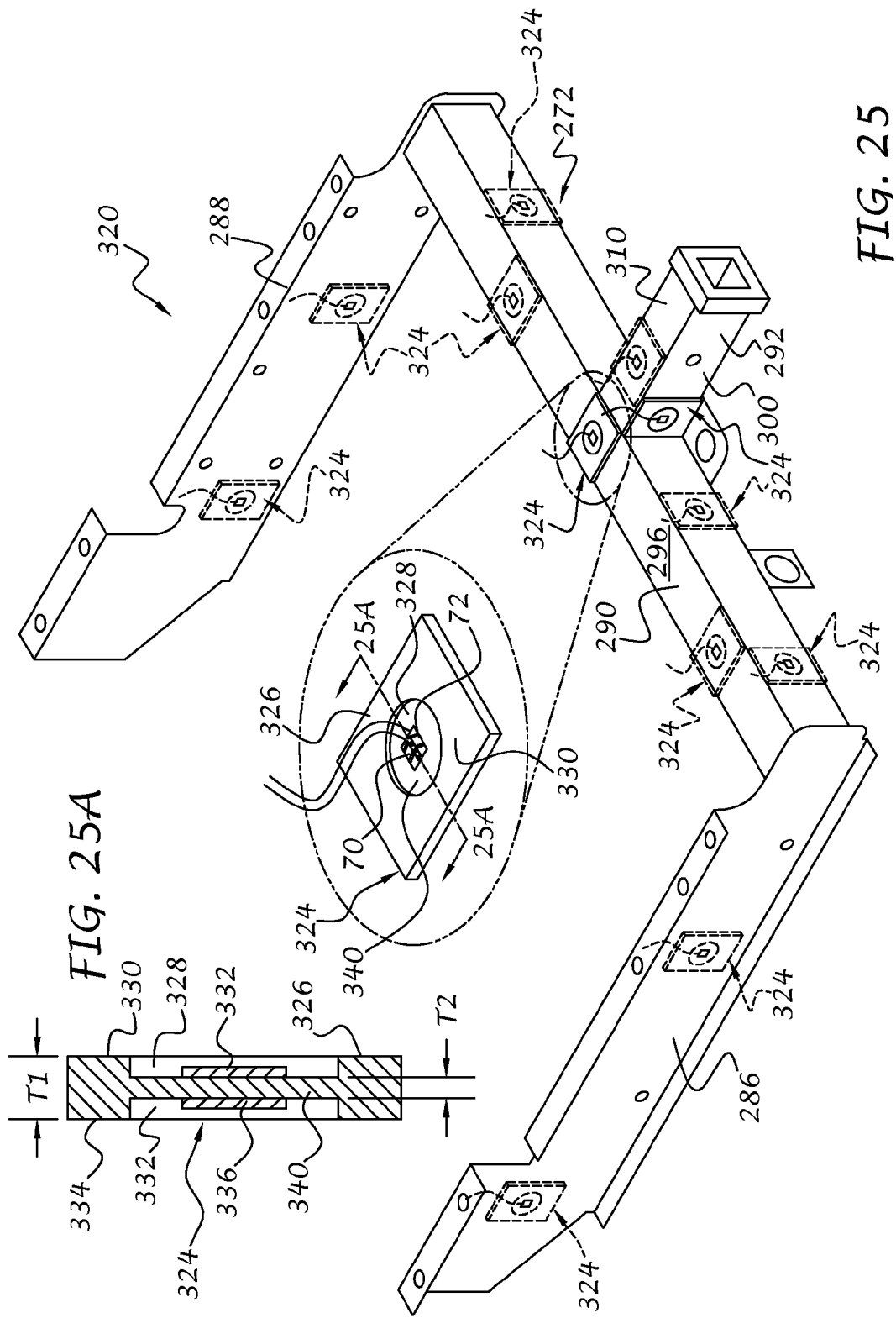
FIG. 25 is an isometric view of a receiver hitch system in accordance with yet another embodiment of the invention, illustrating various positions where sensors may be located to measure the tongue weight, towed vehicle weight, and other parameters, with an enlarged modular strain sensor assembly for the purpose of more clearly illustrating the invention.

Referring now to FIGS. 25 and 25A, a receiver hitch system 320 in accordance with yet another embodiment of the invention is illustrated. The receiver hitch system 320 is similar in construction to the receiver hitch system 270 previously described, and includes a receiver hitch 322 with one or more modular strain sensor assemblies 324 mounted thereto. Each strain sensor assembly 324 preferably includes a sensor mounting plate 326, a first recessed sensor area 328 formed in one face 330 thereof, a second recessed sensor area 332 formed in the opposite face 334 thereof, and strain gauges 336 and 338, preferably similar to the strain gauges previously described, fixedly secured to a center web 340 in their respective recessed sensor areas.

The sensor mounting plate 326 has a first thickness T1 for welding, fastening, or otherwise mounting the modular strain sensor assembly at various locations on the receiver hitch 322, as illustrated by the sensor assemblies 24 in both solid an broken lines. The recessed sensor areas 328 and 332 are preferably formed in opposite sides of the mounting plate 326 to create a second thickness T2 which is smaller than the first thickness T1 for maximizing the strain to be measured without compromising the integrity of the receiver hitch 322.

Each strain gauge 336, 338 preferably includes dual element strain sensors 70, 72 that are angled at approximately 90 degrees from each other to measure shear stresses in the center web 340. Preferably, the modular strain sensor assemblies are mounted to one of the side surfaces 300 of the receiver tube 292 and the upper surface 296 of the crossbar 290 such that the strain gauges are oriented parallel with their respective strain axes (with the strain sensors 70, 72 angled at 45 degrees with respect to vertical or horizontal) to sense the shear stresses caused by vertical and horizontal loads on the hitch ball 26. However, it will be understood, as mentioned above, that the modular strain sensor assemblies can be mounted at any suitable location on the receiver hitch or even a drawbar or other structure that is stressed when towing a vehicle.

The provision of modular strain sensor assemblies facilitates manufacture of the receiver hitch since, during assembly, the strain gauges must be permanently bonded to the surface of the material using special epoxy adhesive, application of pressure and heat during the curing process. Due to the relatively small size of the modular strain sensor assembly, the plates can be stacked closely together during heat curing in smaller ovens than if the strain gauges were to be directly adhered to the crossbars and receiver tubes prior to assembly of the receiver hitches. Moreover, the modules allow flexibility in material selection and center web thickness to maximize the measurable range of shear forces over the anticipate range of loads that the receiver hitch will be subjected to.

Figure 26:
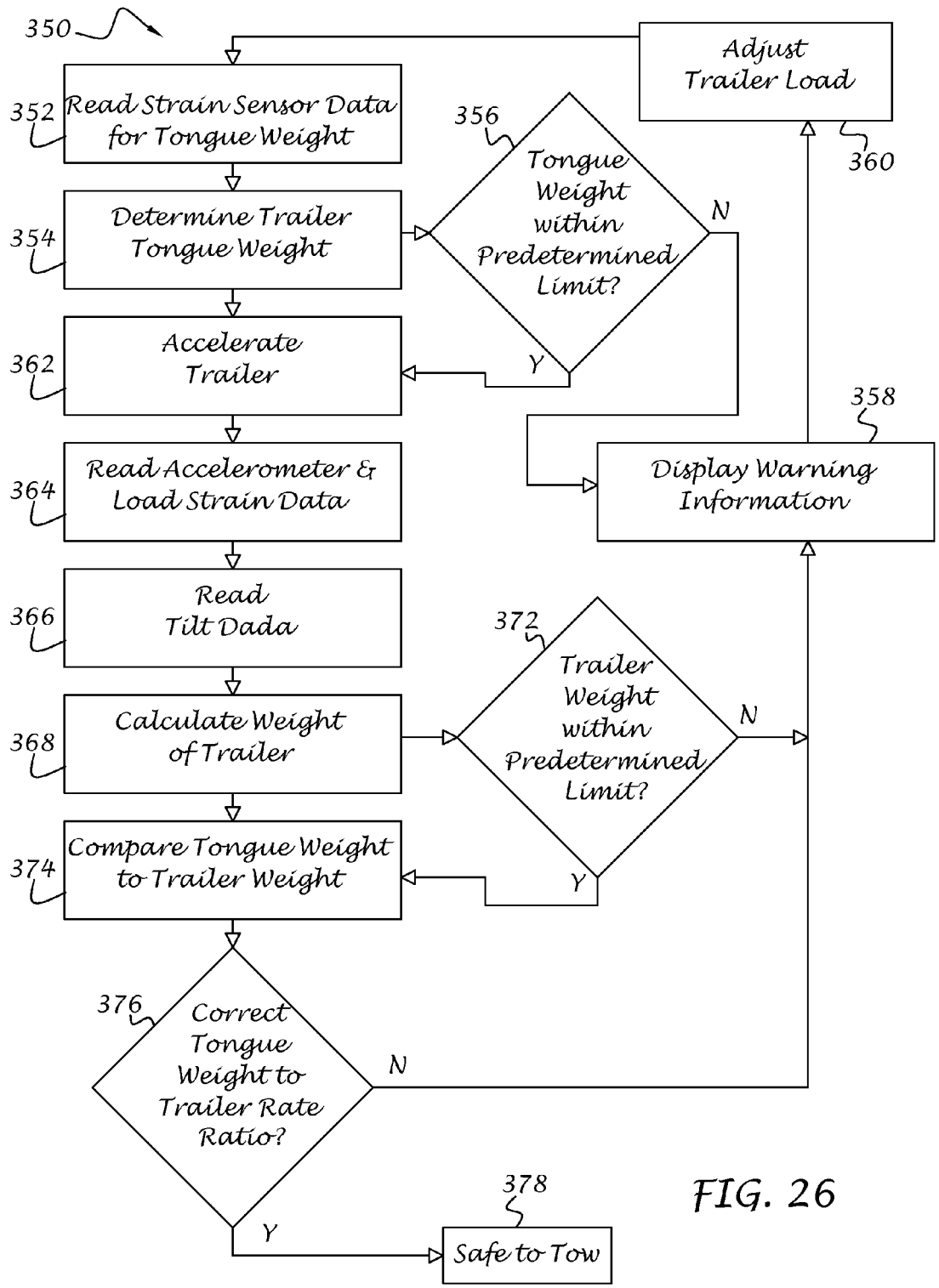
FIG. 26 is a block diagram of a method for determining a safe towing condition of a trailer or other vehicle to be towed.

Referring now to FIG. 26, a method 350 for determining a safe towing condition of a trailer or other vehicle to be towed with the hitch system of the present invention is illustrated, whether it be associated with the drawbar transducer systems of the previous embodiments or the above-described receiver hitch systems. At block 352, the strain sensor data associated with the trailer tongue weight is read by the processor. At block 354, the trailer tongue weight is determined based on the strain sensor data. At block 356, it is determined if the tongue weight is within the maximum safe load for the tow vehicle. If not, warning information is displayed at 358 and the user instructed to adjust the load at block 360. The warning information as well as other data can be communicated via Bluetooth to a smartphone, wirelessly to a display device, and/or via hardwire to a vehicle console or the like where other information can be displayed, such as is commonly practiced including but not limited to location based on GPS signals, trip information, and so on.

If at block 356 it is determined that the trailer tongue weight is within the maximum safe load for the tow vehicle, at block 362 the user is instructed to drive the trailer, preferably in a forward direction, for a short distance. At block 364, the acceleration and/or deceleration data associated with movement of the towed vehicle is read, along with strain sensor data associated with the fore and aft (pulling forces) present on the drawbar transducer or receiver hitch. In most cases, the acceleration data can be gathered very quickly so that the travel distance to obtain the acceleration data will be relatively short, on the order of a few feet, and the travel speed will be relatively low, such that obtaining the acceleration and pulling force readings will be relatively quick. The display, an audible signal, or other means can be used to notify a user when to start and/or stop the tow vehicle with attached trailer. At block 366, tilt data from the tilt sensor 258 (FIG. 22) can be used for accommodating both trailer tongue weight calculations and trailer weight calculations when the trailer is on an inclined surface.

At block 368, the weight of the trailer, whether empty or loaded, is calculated. This is possible based on the instantaneous (or average) acceleration as measured by the accelerometer and the instantaneous (or average) fore and aft load on the receiver hitch (or draw bar) as measured by the strain sensors in accordance with the following formula:

$$F = m \times A \tag{1}$$

Where F is the pulling force, m is the mass of the towed vehicle, and A is the acceleration of the towed or towing vehicle in the pulling force direction. Since the pulling force F is known from one or more of the strain sensors as previously described, such as strain gauge 332, and/or 334 located on the upper surface 296 of the crossbar 290, and further since the acceleration is known from the accelerometer 256 (FIG. 22), the mass of the towed vehicle can be calculated as follows:

$$m = \frac{A}{F} \tag{2}$$

Once the mass of the towed vehicle has been determined, the gross weight of the towed vehicle can be calculated as follows:

$$W = m \times g \text{ or } W = \frac{A}{F} \times g \tag{3}$$

Where W is the weight of the towed vehicle, m is the mass of the towed vehicle, and g is the gravitational constant. If needed, the mass or weight of the towing vehicle can be predetermined and factored out before determining the weight W of the trailer. When the mass or weight of the tow vehicle is a factor, then the Gross Combination Weight (GCW), the combined actual weight of the tow vehicle and towed vehicle can be calculated and compared to the tow vehicle's Gross Combination Weight Rating (GCWR), which is the safe combined weight of the tow vehicle and trailer, the passengers, luggage, equipment, and other items. If the GCWR is exceeded, then the vehicle's engine, transmission, brakes, and so forth can become stressed beyond their design limits and void new vehicle warranty.

The weight of the trailer can be constantly monitored during towing, factoring out variations in road and travel conditions as described above. If the weight of the trailer changes beyond a predetermined delta factor, such as when a portion of the load has been lost, then the user is alerted to investigate the problem.

If the towing vehicle and towed vehicle are traveling up or down a sloped road surface, the tilt sensors 258 (FIG. 22) can be used to detect the amount of slope and adjust both the calculated gross trailer weight and the tongue weight of the towed vehicle by factoring out the gravitational component of the pulling force as follows:

$$W = m \times g \sin \theta \tag{4}$$

Where θ is the slope of the road surface as measured by the tilt sensors. Since $$m = \frac{A}{F}$$

according equation (2) above, then:

$$W = \frac{A}{F} \times g \sin \theta \tag{5}$$

In this manner, the gross weight of the trailer or other towed vehicle can be determined quickly and accurately without the necessity of traveling to a publicly accessible scale to determine whether or not the towed vehicle is overloaded or the load is unbalanced or that the tongue weight and/or towing capacity of the towing vehicle have been exceeded. Thus, the present invention eliminates the need for a costly and cumbersome weight scale for determining the weight of the towed vehicle. Accordingly, the operator need only get into the vehicle, step on the gas, step on the brake, then have the gross trailer weight displayed. The trailer would only have to move a few feet to have enough information to calculate the weight.

Once the trailer weight has been calculated, it is determined at block 372 whether or not the trailer weight exceeds the towing capacity of the tow vehicle as predetermined by the vehicle manufacturer. If the towing capacity has been exceeded, then a warning to that effect is displayed at block 358 and the user is prompted to adjust the trailer load. If at block 372 the trailer weight is within the towing capacity of the tow vehicle, the ratio of the tongue weight to the trailer weight can be calculated, as shown at block 374. If at block 376 the ratio of tongue weight to trailer weight is within a predetermined ratio or ratio range, such as 10% to 15% the display can inform the user, at block 378, that the trailer is safely loaded for towing. If however the tongue weight to trailer weight ratio is below or above the predetermined ratio or ratio range, then a warning to that effect is displayed at block 358 and the user is prompted to shift the load at block 360 until the proper ratio has been achieved. At this point, since the trailer weight has already been calculated and determined to be within the towing capacity of the tow vehicle, then the user need only shift the load on the trailer, either forward or aft, until the ratio is within the predetermined ratio range.

Prior to the present invention and its many advantages as disclosed above and many more which will be apparent from the present disclosure, virtually the only way to measure the trailer weight was to take it to a public scale (such as at a landfill or truck stop), which could be dangerous in and of itself if the trailer is improperly loaded to begin with.

Thus, with the trailer weight and trailer tongue weight known, and with such information stored in memory for later retrieval when determining if repairs to the vehicle are covered under warranty, vehicle manufacturers would be able to quantify with reasonable accuracy whether or not the towing capacity of the vehicle has been exceeded and void the warranty where abuse from the customer has occurred, or to even protect the vehicle manufacturer in the event of a lawsuit where injury or loss of property has occurred due to improper loading and/or towing.

It will be understood that terms of orientation and/or position such as upper, lower, vertical, horizontal, front, rear, and so on, relate to relative rather than absolute orientations and/or positions.

It will be appreciated by those skilled in the art that changes could be made to the embodiments described above without departing from the broad inventive concept thereof. It will be understood, therefore, that this invention is not limited to the particular embodiments disclosed, but it is intended to cover modifications within the spirit and scope of the present invention as defined by the appended claims.

I claim:

1. A drawbar transducer for determining a tongue weight of a towed vehicle, the drawbar transducer comprising:
   an elongate body having first and second end portions for connection between a towing vehicle and the towed vehicle;
   a coupling section formed at the first end portion of the elongate body and being adapted for connection to a hitch ball for coupling with a trailer tongue of the towed vehicle;
   a mounting section formed at the second end portion of the elongate body and being adapted for connection to a hitch of the towing vehicle; and
   an intermediate sensing section formed on the elongate body and being located between the coupling section and the mounting section, the sensing section including:
      a measurement wall having a first thickness;
      at least one sensor area with at least a first sensor surface formed in the measurement wall, the at least one sensor area having a second thickness that is less than the first thickness; and
      at least one strain sensor located in the senor area and connected to the first sensor surface, with the first sensor area being subjected to a greater strain than the surrounding measurement wall due to the second thickness being less than the first thickness to thereby sense a load applied to the coupling section.

2. A drawbar transducer according to claim 1, wherein the sensing section further comprises:
   a top wall; and
   a bottom wall;
   wherein the measurement wall comprises an upright measurement wall extending between the top and bottom walls to define the first measurement surface.

3. A drawbar transducer according to claim 2, wherein the upright measurement wall is located centrally between the top wall and bottom wall to form a generally I-beam shaped cross section of the intermediate sensing section.

4. A drawbar transducer according to claim 3, wherein the at least one sensor area comprises first and second sensor areas with the first measurement surface and a second measurement surface formed on opposite sides of the upright measurement wall.

5. A drawbar transducer according to claim 4, wherein the at least one strain sensor comprises first and second strain sensors located in the first and second sensor areas and connected to the first and second measurement surfaces, respectively.

6. A drawbar transducer according to claim 5, wherein the first and second sensors extend in the same direction.

7. A drawbar transducer according to claim 5, wherein the first and second sensors extend in different directions.

8. A drawbar transducer according to claim 5, wherein the top wall, bottom wall, and upright measurement wall form opposing first and second compartments on opposite sides of the upright measurement wall between the top and bottom walls.

9. A drawbar transducer according to claim 8, and further comprising:
   an electronics section located in one of the compartments, the electronics section including a PCB with a processor operably connected to the first and second strain sensors for determining a load applied to the coupling section.

10. A drawbar transducer according to claim 9, wherein the electronics section further comprises a radio frequency transmitter or transceiver for transmitting data reflective of a load applied to the coupling section.

11. A system for determining the tongue weight of a towed vehicle comprising the drawbar transducer of claim 10, and further comprising:
   a portable display unit comprising:
   a radio frequency receiver or transceiver for receiving the transmitted data reflective of the applied load;
   a second processor for processing the transmitted data; and
   a display operably connected to the second processor for displaying information related to the tongue weight of a vehicle based on the transmitted data.

12. A system according to claim 11, wherein the portable display unit comprises a smartphone.

13. A drawbar transducer according to claim 1, and further comprising:
an electronics section operably associated with the measurement wall, the electronics section including a processor operably connected to the at least one strain sensor for determining a load applied to the coupling section.

14. A drawbar transducer according to claim 13, wherein the electronics section further comprises a radio frequency transmitter or transceiver for transmitting data reflective of a load applied to the coupling section.

15. A drawbar transducer according to claim 14, wherein the electronics section further comprises:
a GPS unit operably connected to the processor for determining a location and instantaneous velocity of the towed vehicle;
an accelerometer operably connected to the processor for determining forces on the coupling section related to acceleration and deceleration;
a tilt sensor operably connected to the processor for determining an angle of the towed vehicle;
the processor being operable to process data from the GPS unit, the accelerometer, and the tilt sensor to determine an operating condition of the towed vehicle.

16. A system for determining the tongue weight of a towed vehicle comprising the drawbar transducer of claim 14, and further comprising:
a portable display unit comprising:
a radio frequency receiver or transceiver for receiving the transmitted data reflective of the applied load;
a second processor for processing the transmitted data; and
a display operably connected to the second processor for displaying information related to the tongue weight of a vehicle based on the transmitted data.

17. A system for determining the tongue weight of a towed vehicle, the system comprising:
A) a transducer body with a first end portion for connection to the towed vehicle and a second end portion for connection to a towing vehicle, the transducer body having:
i) a coupling section adapted located at the first end portion for connection to a hitch ball for coupling in turn with a trailer tongue of the towed vehicle;
ii) a mounting section being adapted for receipt into a receiver hitch of a towing vehicle; and
iii) an intermediate sensing section located between the coupling section and the mounting section, the intermediate sensing section including:
a) first and second compartments formed in opposite sides of the transducer body to form a measurement wall with a first thickness;
b) first and second sensor areas formed as respective first and second depressions in opposite sides of the measurement wall in the first and second compartments, respectively, the measurement wall having first and second sensor surfaces within the first and second depressions, respectively, with a second thickness between the first and second sensor surfaces at the sensor areas being less than the first thickness; and
c) at least one strain sensor located in at least one of the first and second senor areas and connected to one of the first and second sensor surfaces for sensing a load applied to the coupling section; and B) a display for displaying information related to the tongue weight of a towed vehicle based on the transmitted data.

18. A drawbar transducer according to claim 16, wherein the display comprises a remote display adapted for wireless connection to the transducer body for receiving data from the at least one strain sensor indicative of the applied load.

19. A drawbar transducer according to claim 17, wherein the transducer section further comprises:
a top wall; and
a bottom wall;
wherein the measurement wall comprises an upright measurement wall extending between the top and bottom walls.

20. A drawbar transducer according to claim 18, wherein the upright measurement wall is located centrally between the top wall and bottom wall to form a generally I-beam shaped cross section of the intermediate sensing section.

21. A receiver hitch system comprising:
a crossbar;
a mounting bracket connected at opposite ends of the crossbar for connecting the receiver hitch to a tow vehicle;
a receiver tube extending rearwardly from the crossbar, the receiver tube being adapted for connection to a drawbar to thereby couple a trailer to the tow vehicle;
a first surface anomaly associated with at least one of the crossbar, mounting bracket, and receiver tube;
a first strain sensor operably associated with the receiver hitch and connected to the first surface anomaly for measuring at least one of a trailer tongue weight and trailer pull force; and
a processor operably connected to the first strain sensor for calculating the at least one trailer tongue weight and trailer pull force as a function of strain measured at the first surface anomaly.

22. A receiver hitch system according to claim 21, and further comprising a second surface anomaly associated with at least another of the crossbar, mounting bracket and receiver tube, and a second strain sensor operably associated with the receiver hitch and connected to the second surface anomaly for measuring the other of the trailer tongue weight and trailer pull force, the second strain sensor being operably connected to the processor for calculating the other of the trailer tongue weight and trailer pull force as a function of strain measured at the second surface anomaly.

23. A receiver hitch system according to claim 22, wherein the first is connected to the first surface anomaly on the receiver tube for measuring the trailer tongue weight and the second sensor is connected to the second surface anomaly on the drawbar for measuring the trailer pull force.

24. A receiver hitch system comprising:
a crossbar;
a mounting bracket connected to the crossbar for connecting the receiver hitch to a tow vehicle;
a receiver tube extending rearwardly from the crossbar, the receiver tube being adapted for connection to a drawbar to thereby couple a trailer to the tow vehicle;
a first strain sensor operably associated with the receiver hitch for measuring the trailer tongue weight;
a second strain sensor operably associated with the receiver hitch for measuring the trailer pull force;
a processor operably connected to the first and second strain sensors for calculating the trailer tongue weight and trailer pull force, respectively; and an accelerometer operably associated with the processor for determining an acceleration of the tow vehicle.

25. A receiver hitch system according to claim 24, wherein the processor is programmed to calculate a weight of the trailer based on the determined acceleration and trailer pull force.

26. A receiver hitch system according to claim 25, wherein the processor is programmed to calculate a ratio of the trailer tongue weight to trailer weight and determine a safe towing condition when the calculated ratio falls within a predetermined ratio range.

27. A modular strain sensor assembly comprising:
a sensor mounting plate have a first face and a second face located on an opposite side of the sensor mounting plate;
a first recessed sensor area formed in the first face;
a second recessed sensor area formed in the second face opposite the first recessed sensor area to thereby create a center web therebetween;
a first strain gauge fixedly secured to the center web in the first recessed sensor area;
a second strain gauge fixedly secured to the center web in the second recessed sensor area;
wherein a first thickness between the first and second faces is greater than a second thickness of the center web such that shear stresses on the center web is greater than shear stresses on the first and second faces when a load is applied to the modular strain sensor assembly.

28. A receiver hitch system having at least at least one modular strain sensor assembly according to claim 27, and further comprising:
a crossbar;
a mounting bracket connected at opposite ends of the crossbar for connecting the receiver hitch to a tow vehicle;
a receiver tube extending rearwardly from the crossbar, the receiver tube being adapted for connection to a drawbar to thereby couple a trailer to the tow vehicle;
wherein the at least one modular strain sensor assembly is located on one of the receiver tube and crossbar for measuring one of a trailer pull force and a trailer tongue weight.

29. A receiver hitch system according to claim 28, and further comprising a second modular strain sensor assembly located on the other of the receiver tube and crossbar for measuring the other of the trailer pull force and trailer tongue weight.

30. A receiver hitch system according to claim 29, and further comprising a processor operably connected to the first and second modular strain sensor assemblies for calculating the trailer tongue weight and trailer pull force.

31. A method for determining a safe towing condition of a trailer with respect to a predetermined tow rating of a tow vehicle, the method comprising:
connecting a trailer hitch between a tongue of the trailer and the tow vehicle;
operably associating a sensing system with at least one of the trailer hitch, the trailer tongue, and the vehicle, the sensing system being adapted for measuring the tongue weight, trailer weight, and pull forces of the trailer during pulling and being operably associated with a user interface for at least visibly or audibly indicating a safe or unsafe towing condition;
determining a tongue weight of the trailer with the sensing system;
determining if the tongue weight of the trailer exceeds a predetermined limit;
indicating an unsafe towing condition when the tongue weight of the trailer has exceeded the predetermined limit to thereby allow an operator to adjust a load associated with the trailer;
indicating a safe towing condition when the tongue weight of the trailer is at or below the predetermined limit;
pulling the trailer with the tow vehicle;
measuring acceleration and pull forces of the trailer with the sensing system during pulling;
determining the weight of the trailer by dividing the pull force by the acceleration multiplying the quotient by a gravitational acceleration; and
indicating an unsafe towing condition if the weight of the trailer exceeds a predetermined level.

32. A method according to claim 31, and further comprising determining a safe towing condition when a ratio of the tongue weight to the trailer weight is within a predetermined range, and indicating the safe towing condition to the user.

33. A method for determining a safe condition of a trailer with respect to a predetermined tow rating of a tow vehicle, the method comprising:
determining a tongue weight of the trailer;
pulling the trailer with the tow vehicle;
measuring acceleration and pull forces of the trailer during pulling;
determining the weight of the trailer by dividing the pull force by the acceleration multiplying the quotient by a gravitational acceleration
monitoring the pull forces during trailer towing;
calculating an average drag coefficient based on the pull forces at constant velocity; and
signaling when a new drag coefficient is greater than a predetermined change in the average drag coefficient.

* * * * *